United States Patent
Summerfield et al.

(10) Patent No.: US 10,534,166 B2
(45) Date of Patent: Jan. 14, 2020

(54) OPTICAL TARGETING INFORMATION PROJECTION SYSTEM

(71) Applicant: Lightforce USA, Inc., Orofino, ID (US)

(72) Inventors: Abram W. Summerfield, Orofino, ID (US); Brian J. Bellah, Orofino, ID (US); Chad D. Beauregard, Orofino, ID (US)

(73) Assignee: Lightforce USA, Inc., Orofino, ID (US)

( * ) Notice: Subject to any disclaimer, the term of this patent is extended or adjusted under 35 U.S.C. 154(b) by 0 days.

(21) Appl. No.: 15/778,869

(22) PCT Filed: Sep. 22, 2017

(86) PCT No.: PCT/US2017/052930
§ 371 (c)(1),
(2) Date: May 24, 2018

(87) PCT Pub. No.: WO2018/057872
PCT Pub. Date: Mar. 29, 2018

(65) Prior Publication Data
US 2019/0219813 A1      Jul. 18, 2019

Related U.S. Application Data

(60) Provisional application No. 62/398,296, filed on Sep. 22, 2016.

(51) Int. Cl.
*G02B 23/10* (2006.01)
*F41G 1/38* (2006.01)
(Continued)

(52) U.S. Cl.
CPC ............. *G02B 23/10* (2013.01); *F41G 1/345* (2013.01); *F41G 1/38* (2013.01); *F41G 3/06* (2013.01);
(Continued)

(58) Field of Classification Search
CPC .......... F41G 1/345; F41G 1/38; G02B 27/142
(Continued)

(56) References Cited

U.S. PATENT DOCUMENTS 1,708,389 A    4/1929   Karnes
3,161,716 A    12/1964  Burris et al.
(Continued)

FOREIGN PATENT DOCUMENTS

DE    102014112794 A1    3/2016
EP         1340956 B1    12/2006
(Continued)

OTHER PUBLICATIONS

International Bureau of WIPO, International Preliminary Report on Patentability issued in corresponding PCT Application No. PCT/US2017/052930, dated Mar. 26, 2019, 7 pages.
(Continued)

*Primary Examiner* — Samir Abdosh
(74) *Attorney, Agent, or Firm* — Wood Herron & Evans LLP

(57) ABSTRACT

An optical projection system (12) for a weapon system aiming scope (10) having at least objective and ocular lenses (24, 26) defining an optical path through which a target image (30) is observed. The projection system (12) includes a primary beamsplitter (62) positioned in the optical path, a secondary beamsplitter (64) positioned adjacent the primary beamsplitter (62) and off the optical path, a micro-display (60) that provides a data image (38, 88) containing targeting information (100, 101, 102, 104, 106, 108, 110, 112), and an illumination source (52). The illumination source (52) generates light directed through the secondary beamsplitter (64) to illuminate and reflect off the micro-display (60) so as to define a reflected data image (88), and the secondary beamsplitter (64) directs the reflected data image (88) into the
(Continued)

primary beamsplitter (62). The primary beamsplitter (62) combines the data image (88) with an optical target image (30) in the optical path so as to convey targeting information (100, 101, 102, 104, 106, 108, 110, 1112) to a shooter or spotter viewing the optical target image (30).

11 Claims, 13 Drawing Sheets

(51) Int. Cl.
*F41G 1/34* (2006.01)
*F41G 3/06* (2006.01)
*F41G 3/08* (2006.01)
*G02B 27/14* (2006.01)

(52) U.S. Cl.
CPC ............. *F41G 3/08* (2013.01); *G02B 23/105* (2013.01); *G02B 27/142* (2013.01)

(58) Field of Classification Search
USPC ............................................................ 42/123
See application file for complete search history.

(56) References Cited

U.S. PATENT DOCUMENTS

| | | | |
|---|---|---|---|
| 3,386,330 A | 6/1968 | Carson | |
| 3,464,770 A | 9/1969 | Schmidt | |
| 3,506,330 A | 4/1970 | Allen | |
| 3,533,696 A | 10/1970 | Winter | |
| 3,671,100 A * | 6/1972 | Bushman et al. | G02B 27/0101 359/363 |
| 3,672,782 A | 6/1972 | Akin, Jr. | |
| 3,743,818 A | 7/1973 | Marasco et al. | |
| 3,749,494 A | 7/1973 | Hodges | |
| 3,948,587 A | 4/1976 | Rubbert | |
| 4,248,496 A | 2/1981 | Akin, Jr. et al. | |
| 4,311,902 A | 1/1982 | Koll | |
| 4,395,096 A | 7/1983 | Gibson | |
| 4,415,233 A * | 11/1983 | Itoh | G02B 27/144 359/582 |
| 4,531,052 A | 7/1985 | Moore | |
| 4,561,204 A | 12/1985 | Binion | |
| 4,671,165 A | 6/1987 | Heidmann et al. | |
| 4,695,161 A | 9/1987 | Reed | |
| 4,743,765 A | 5/1988 | Ekstrand | |
| 4,777,352 A | 10/1988 | Moore | |
| 4,965,439 A | 10/1990 | Moore | |
| 5,020,902 A | 6/1991 | Kits van Heyningen et al. | |
| 5,026,158 A | 6/1991 | Golubic | |
| 5,052,801 A | 10/1991 | Downes, Jr. et al. | |
| 5,092,670 A | 3/1992 | Preston | |
| 5,221,956 A * | 6/1993 | Patterson | G01S 17/10 356/28 |
| 5,225,838 A | 7/1993 | Kanter et al. | |
| 5,291,263 A | 3/1994 | Kong | |
| 5,311,203 A | 5/1994 | Norton | |
| 5,339,720 A | 8/1994 | Pellarin et al. | |
| 5,375,072 A | 12/1994 | Cohen | |
| 5,491,546 A | 2/1996 | Wascher et al. | |
| 5,528,354 A | 6/1996 | Uwira | |
| 5,577,733 A | 11/1996 | Downing | |
| 5,612,779 A | 3/1997 | Dunne | |
| 5,652,651 A | 7/1997 | Dunne | |
| 5,669,174 A | 9/1997 | Teetzel | |
| 5,686,690 A | 11/1997 | Lougheed et al. | |
| 5,721,641 A | 2/1998 | Aoki | |
| 5,771,623 A | 6/1998 | Pernstich et al. | |
| 5,783,753 A | 7/1998 | Kellerman | |
| 5,867,313 A * | 2/1999 | Schweitzer | G02B 23/12 359/353 |
| 5,903,996 A | 5/1999 | Morley | |
| 5,907,436 A | 5/1999 | Perry et al. | |
| 5,920,995 A | 7/1999 | Sammut | |
| 5,926,259 A | 7/1999 | Bamberger et al. | |
| 5,939,645 A | 8/1999 | Kellerman | |
| 6,032,374 A | 3/2000 | Sammut | |
| 6,057,910 A | 5/2000 | Dunne | |
| 6,132,048 A | 10/2000 | Gao et al. | |
| 6,226,077 B1 | 5/2001 | Dunne | |
| 6,247,259 B1 | 6/2001 | Tsadka et al. | |
| 6,252,706 B1 | 6/2001 | Kaladgew | |
| 6,257,074 B1 | 7/2001 | Kellerman | |
| 6,269,581 B1 | 8/2001 | Groh | |
| 6,311,424 B1 * | 11/2001 | Burke | F41G 1/40 42/111 |
| 6,396,639 B1 | 5/2002 | Togino et al. | |
| 6,453,595 B1 | 9/2002 | Sammut | |
| 6,516,551 B2 | 2/2003 | Gaber | |
| 6,516,699 B2 | 2/2003 | Sammut et al. | |
| 6,583,862 B1 | 6/2003 | Perger | |
| 6,640,482 B2 | 11/2003 | Carlson | |
| 6,681,512 B2 | 1/2004 | Sammut | |
| 6,862,832 B2 | 3/2005 | Barrett | |
| 6,873,406 B1 | 3/2005 | Hines et al. | |
| 7,059,170 B2 | 6/2006 | Kellerman et al. | |
| 7,089,845 B2 | 8/2006 | Friedli et al. | |
| 7,124,531 B1 | 10/2006 | Florence et al. | |
| 7,162,825 B2 | 1/2007 | Ugolini et al. | |
| 7,175,279 B2 | 2/2007 | Drazic et al. | |
| 7,185,455 B2 | 3/2007 | Zaderey | |
| 7,194,838 B2 | 3/2007 | Smith, III | |
| 7,196,329 B1 | 3/2007 | Wood et al. | |
| 7,210,262 B2 | 5/2007 | Florence et al. | |
| 7,237,355 B2 | 7/2007 | Smith, III | |
| 7,239,377 B2 | 7/2007 | Vermillion et al. | |
| 7,249,493 B2 | 7/2007 | Kellerman et al. | |
| 7,256,940 B2 | 8/2007 | Kaertner et al. | |
| 7,269,920 B2 | 9/2007 | Staley, III | |
| 7,295,296 B1 | 11/2007 | Galli | |
| 7,296,358 B1 | 11/2007 | Murphy et al. | |
| 7,310,904 B2 | 12/2007 | Ugolini et al. | |
| 7,325,320 B2 | 2/2008 | Gnepf et al. | |
| 7,329,127 B2 | 2/2008 | Kendir et al. | |
| 7,333,270 B1 | 2/2008 | Pochapsky et al. | |
| 7,343,707 B2 | 3/2008 | Smith, III | |
| 7,516,571 B2 * | 4/2009 | Scrogin | F41G 1/38 42/114 |
| 7,574,825 B2 | 8/2009 | Lacorte | |
| 7,575,327 B2 | 8/2009 | Uchiyama | |
| 7,586,586 B2 | 9/2009 | Constantikes | |
| 7,654,029 B2 | 2/2010 | Peters et al. | |
| 7,658,031 B2 | 2/2010 | Cross et al. | |
| 7,676,137 B2 * | 3/2010 | Schick | F41G 1/345 33/297 |
| 7,690,145 B2 | 4/2010 | Peters et al. | |
| 7,703,679 B1 | 4/2010 | Bennetts et al. | |
| 7,712,225 B2 | 5/2010 | Sammut | |
| 7,719,769 B2 | 5/2010 | Sugihara et al. | |
| 7,721,481 B2 | 5/2010 | Houde-Walter | |
| 7,739,823 B2 | 6/2010 | Shapira et al. | |
| 7,805,020 B2 | 9/2010 | Trudeau et al. | |
| 7,832,137 B2 | 11/2010 | Sammut et al. | |
| 7,856,750 B2 | 12/2010 | Sammut et al. | |
| 7,859,650 B2 | 12/2010 | Vermillion et al. | |
| 7,864,432 B2 | 1/2011 | Ottney | |
| 7,905,046 B2 | 3/2011 | Smith, III | |
| 7,937,878 B2 | 5/2011 | Sammut et al. | |
| 7,946,048 B1 | 5/2011 | Sammut | |
| 8,001,714 B2 | 8/2011 | Davidson | |
| 8,046,951 B2 | 11/2011 | Peters et al. | |
| 8,047,118 B1 | 11/2011 | Teetzel et al. | |
| 8,051,597 B1 | 11/2011 | D'Souza et al. | |
| 8,081,298 B1 | 12/2011 | Cross | |
| 8,091,268 B2 | 1/2012 | York | |
| 8,100,044 B1 | 1/2012 | Teetzel et al. | |
| 8,109,029 B1 | 2/2012 | Sammut et al. | |
| 8,172,139 B1 | 5/2012 | McDonald et al. | |
| 8,201,741 B2 | 6/2012 | Bennetts et al. | |
| 8,230,635 B2 | 7/2012 | Sammut et al. | |
| 8,264,770 B2 | 9/2012 | Minor et al. | |
| 8,270,086 B1 | 9/2012 | Hall et al. | |
| 8,281,995 B2 | 10/2012 | Bay | |

(56) References Cited

U.S. PATENT DOCUMENTS

| | | |
|---|---|---|
| 8,297,173 B1 | 10/2012 | Teetzel et al. |
| 8,314,923 B2 | 11/2012 | York et al. |
| 8,336,776 B2 | 12/2012 | Horvath et al. |
| 8,353,454 B2 | 1/2013 | Sammut et al. |
| 8,363,321 B1 | 1/2013 | Pochapsky |
| 8,365,455 B2 | 2/2013 | Davidson |
| 8,375,620 B2 | 2/2013 | Staley, III |
| 8,414,298 B2 | 4/2013 | D'Souza et al. |
| 8,448,372 B2 | 5/2013 | Peters et al. |
| 8,468,930 B1 | 6/2013 | Bell |
| 8,558,337 B2 | 10/2013 | Maryfield et al. |
| 8,599,482 B2 | 12/2013 | Schlierbach |
| 8,608,069 B1 | 12/2013 | Bay |
| 8,656,630 B2 | 2/2014 | Sammut |
| 8,705,173 B2 | 4/2014 | Peters et al. |
| 8,707,608 B2 | 4/2014 | Sammut et al. |
| 8,713,843 B2 | 5/2014 | Windauer |
| 8,714,073 B2 | 5/2014 | Burzel |
| 8,783,568 B2 | 7/2014 | Kaufmann |
| 8,804,237 B2 | 8/2014 | Tesmar et al. |
| 8,826,583 B2 | 9/2014 | Kepler et al. |
| 8,830,589 B2 | 9/2014 | Thomas et al. |
| 8,832,988 B2 | 9/2014 | Hu |
| 8,833,655 B2 | 9/2014 | McCarty et al. |
| 8,857,714 B2 | 10/2014 | Benson |
| 8,893,971 B1 | 11/2014 | Sammut et al. |
| 8,905,307 B2 | 12/2014 | Sammut et al. |
| 8,923,566 B2 | 12/2014 | Hsieh et al. |
| 8,936,193 B2 | 1/2015 | McHale et al. |
| 8,939,366 B1 | 1/2015 | Kelly |
| 8,959,824 B2 | 2/2015 | Sammut et al. |
| 8,964,298 B2 | 2/2015 | Haddick et al. |
| 8,966,806 B2 | 3/2015 | Sammut et al. |
| 8,978,539 B2 | 3/2015 | Teetzel et al. |
| 8,988,648 B2 | 3/2015 | Trissel et al. |
| 8,991,702 B1 | 3/2015 | Sammut et al. |
| 8,997,392 B1 | 4/2015 | Jung et al. |
| 9,004,358 B2 | 4/2015 | Bay |
| 9,038,901 B2 | 5/2015 | Paterson et al. |
| 9,068,794 B1 | 6/2015 | Sammut |
| 9,091,507 B2 | 7/2015 | Paterson et al. |
| 9,121,671 B2 | 9/2015 | Everett |
| 9,127,910 B2 | 9/2015 | Volfson |
| 9,127,911 B2 | 9/2015 | Varshneya et al. |
| 9,151,574 B2 | 10/2015 | Lowrey, III |
| 9,157,701 B2 | 10/2015 | Varshneya et al. |
| 9,175,927 B2 | 11/2015 | Tubb |
| 9,250,036 B2 | 2/2016 | Farca et al. |
| 9,250,038 B2 | 2/2016 | Sammut et al. |
| 9,255,771 B2 | 2/2016 | Sammut et al. |
| 9,279,975 B2 | 3/2016 | Berlips |
| 9,310,163 B2 | 4/2016 | Bay |
| 9,323,061 B2 | 4/2016 | Edwards et al. |
| 9,335,123 B2 | 5/2016 | Sammut |
| 9,335,124 B2 * | 5/2016 | Maryfield ................. F41G 1/30 |
| 9,347,742 B2 | 5/2016 | Varshneya et al. |
| 9,372,070 B1 | 6/2016 | Jancic et al. |
| 9,389,425 B2 | 7/2016 | Edwards et al. |
| 9,429,653 B2 | 8/2016 | Volfson |
| 9,464,871 B2 | 10/2016 | Bay |
| 9,466,120 B2 | 10/2016 | Maryfield et al. |
| 9,494,686 B2 | 11/2016 | Maryfield et al. |
| 9,506,723 B2 | 11/2016 | Teetzel et al. |
| 9,506,725 B2 | 11/2016 | Maryfield et al. |
| 9,568,279 B2 | 2/2017 | Maryfield et al. |
| 9,678,208 B2 | 6/2017 | Volfson |
| 2002/0129535 A1 | 9/2002 | Osborn |
| 2003/0010190 A1 | 1/2003 | Sammut et al. |
| 2003/0012035 A1 | 1/2003 | Bernard |
| 2003/0132860 A1 | 7/2003 | Feyereisen et al. |
| 2004/0025396 A1 | 2/2004 | Schlierbach et al. |
| 2004/0201886 A1 | 10/2004 | Skinner et al. |
| 2004/0244262 A1 | 12/2004 | Paige |
| 2005/0021282 A1 | 1/2005 | Sammut et al. |
| 2005/0046706 A1 | 3/2005 | Sesek et al. |
| 2005/0198885 A1 | 9/2005 | Staley |
| 2005/0219690 A1 | 10/2005 | Lin et al. |
| 2005/0250085 A1 | 11/2005 | Lemp et al. |
| 2005/0252062 A1* | 11/2005 | Scrogin .................... F41G 1/38 42/119 |
| 2005/0268521 A1 | 12/2005 | Cox et al. |
| 2006/0048432 A1 | 3/2006 | Staley |
| 2006/0201047 A1 | 9/2006 | Lowrey |
| 2006/0254115 A1 | 11/2006 | Thomas et al. |
| 2007/0044364 A1 | 3/2007 | Sammut et al. |
| 2007/0097351 A1* | 5/2007 | York ........................ F41G 3/02 356/5.02 |
| 2007/0137008 A1 | 6/2007 | Anstee |
| 2007/0175080 A1 | 8/2007 | Sammut et al. |
| 2007/0209268 A1 | 9/2007 | Birurakis et al. |
| 2007/0234626 A1 | 10/2007 | Murdock et al. |
| 2007/0277421 A1 | 12/2007 | Perkins et al. |
| 2008/0039962 A1 | 2/2008 | McRae |
| 2008/0098640 A1 | 5/2008 | Sammut et al. |
| 2008/0163536 A1 | 7/2008 | Koch et al. |
| 2008/0290164 A1 | 11/2008 | Papale et al. |
| 2009/0100735 A1* | 4/2009 | Schick .................... F41G 1/345 42/123 |
| 2009/0200376 A1 | 8/2009 | Peters et al. |
| 2009/0205239 A1 | 8/2009 | Smith, III |
| 2009/0225236 A1 | 9/2009 | Yoon |
| 2009/0320348 A1 | 12/2009 | Kelly |
| 2010/0207152 A1 | 8/2010 | Won |
| 2010/0225833 A1 | 9/2010 | Methe et al. |
| 2010/0275768 A1 | 11/2010 | Quinn |
| 2011/0121159 A1 | 5/2011 | Mourar et al. |
| 2011/0141381 A1 | 6/2011 | Minikey, Jr. et al. |
| 2011/0162250 A1 | 7/2011 | Windauer et al. |
| 2011/0168777 A1 | 7/2011 | Bay |
| 2011/0219634 A1 | 9/2011 | Sammut |
| 2011/0271577 A1 | 11/2011 | Davidson |
| 2011/0314720 A1 | 12/2011 | Cheng |
| 2012/0033195 A1 | 2/2012 | Tai |
| 2012/0075168 A1 | 3/2012 | Osterhout et al. |
| 2012/0097741 A1 | 4/2012 | Karcher |
| 2012/0117848 A1 | 5/2012 | Cox et al. |
| 2012/0126001 A1 | 5/2012 | Justice et al. |
| 2012/0137567 A1 | 6/2012 | Sammut |
| 2012/0182417 A1 | 7/2012 | Everett |
| 2012/0186131 A1 | 7/2012 | Windauer |
| 2013/0014421 A1 | 1/2013 | Sammut et al. |
| 2013/0033746 A1 | 2/2013 | Brumfield |
| 2013/0167425 A1 | 7/2013 | Crispin |
| 2013/0199074 A1* | 8/2013 | Paterson .................. F41G 3/06 42/122 |
| 2013/0278631 A1 | 10/2013 | Border et al. |
| 2013/0279013 A1 | 10/2013 | Edwards et al. |
| 2013/0313320 A1 | 11/2013 | Bay |
| 2013/0333266 A1 | 12/2013 | Gose et al. |
| 2014/0000146 A1 | 1/2014 | Davidson |
| 2014/0002812 A1 | 1/2014 | Kepler et al. |
| 2014/0059915 A1 | 3/2014 | Sammut et al. |
| 2014/0063261 A1 | 3/2014 | Betensky et al. |
| 2014/0075240 A1 | 3/2014 | Ben-Ami |
| 2014/0101982 A1 | 4/2014 | McPhee |
| 2014/0109459 A1 | 4/2014 | Sammut et al. |
| 2014/0110482 A1 | 4/2014 | Bay |
| 2014/0166751 A1 | 6/2014 | Sammut et al. |
| 2014/0182187 A1 | 7/2014 | McHale |
| 2014/0226214 A1 | 8/2014 | Edwards et al. |
| 2014/0231515 A1 | 8/2014 | Bay |
| 2014/0285882 A1 | 9/2014 | Gotz et al. |
| 2014/0339307 A1 | 11/2014 | Sammut et al. |
| 2014/0360083 A1 | 12/2014 | Sammut |
| 2015/0008260 A1 | 1/2015 | Volfson |
| 2015/0020431 A1 | 1/2015 | Sammut et al. |
| 2015/0055119 A1 | 2/2015 | Hamilton |
| 2015/0059226 A1 | 3/2015 | Kepler et al. |
| 2015/0106046 A1 | 4/2015 | Chen et al. |
| 2015/0226522 A1 | 8/2015 | Sammut et al. |
| 2015/0233674 A1 | 8/2015 | Beckman |
| 2015/0247702 A1 | 9/2015 | Davidson et al. |
| 2015/0247703 A1 | 9/2015 | Teetzel et al. |
| 2015/0264229 A1 | 9/2015 | Teetzel et al. |

(56) References Cited

U.S. PATENT DOCUMENTS

| | | |
|---|---|---|
| 2015/0345908 A1 | 12/2015 | Maryfield et al. |
| 2015/0362287 A1 | 12/2015 | Sammut et al. |
| 2015/0362288 A1 | 12/2015 | Sammut et al. |
| 2015/0369565 A1 | 12/2015 | Kepler |
| 2016/0018189 A1 | 1/2016 | Maryfield et al. |
| 2016/0025455 A1 | 1/2016 | Paterson et al. |
| 2016/0061566 A1 | 3/2016 | Chen |
| 2016/0138890 A1 | 5/2016 | Hofmann et al. |
| 2016/0169625 A1 | 6/2016 | Richards |
| 2016/0202282 A1 | 7/2016 | Maryfield et al. |
| 2016/0223293 A1 | 8/2016 | Maryfield et al. |
| 2016/0245619 A1 | 8/2016 | Bay |
| 2016/0265880 A1 | 9/2016 | Maryfield et al. |
| 2016/0290765 A1 | 10/2016 | Maryfield et al. |
| 2017/0108376 A1 | 4/2017 | Maryfield et al. |
| 2017/0227327 A1 | 8/2017 | Thomas et al. |

FOREIGN PATENT DOCUMENTS

| | | |
|---|---|---|
| EP | 1772695 A1 | 4/2007 |
| EP | 1992911 A2 | 11/2008 |
| WO | 9737193 A1 | 10/1997 |
| WO | 200246822 A1 | 6/2002 |
| WO | 2005015285 A2 | 2/2005 |
| WO | 2006060007 A1 | 6/2006 |
| WO | 2008091388 A2 | 7/2008 |
| WO | 2011045759 A1 | 4/2011 |
| WO | 2012061154 A1 | 5/2012 |
| WO | 2013002856 A3 | 4/2013 |
| WO | 2014024188 A1 | 2/2014 |
| WO | 2014167276 A1 | 10/2014 |
| WO | 2015017289 A1 | 2/2015 |
| WO | 2015074055 A1 | 5/2015 |
| WO | 2015103155 A1 | 7/2015 |
| WO | 2016145124 A2 | 9/2016 |

OTHER PUBLICATIONS

Brashear LP, Integrted Ballistic Reticle System (IBRS), Data Sheet, Oct. 17, 2013, Brashear LP (Cleared by the US Army),www.L-3com.com/Brashear, Pittsburg, PA.

European Patent Office, International Search Report & Written Opinion issued in related international application No. PCT/US2013/067755, dated Sep. 22, 2015, 9pp.

* cited by examiner

OPTICAL TARGETING INFORMATION PROJECTION SYSTEM

CROSS-REFERENCE TO RELATED APPLICATION

This application is a national phase application of, and claims priority to, International Patent Application PCT/US17/52930, filed on Sep. 22, 2017, which claims priority to U.S. Provisional Patent Application No. 62/398,296, filed on Sep. 22, 2016, and incorporates the same herein by reference.

TECHNICAL FIELD

The present invention relates generally to devices that display targeting information to a shooter, and more particularly, to such devices that may be mountable to a firearm and display such information through a weapon sighting scope.

BACKGROUND

Weapon-mounted targeting display devices cooperate with a firearm scope to present certain targeting information within a sight picture (or field of view (FOV)) that presents an image of a target. Such targeting display devices thus enable a shooter to view the target and the targeting information simultaneously without breaking cheek-to-stock weld, or otherwise losing target awareness. Such display devices may communicate with a ballistic computer (also referred to as a "calculator" or "solver") that calculates a ballistic solution using known equations and variables including bullet type, range to target, cant angle, angle of incline/decline to target, wind speed and direction, elevation, temperature, humidity, and barometric pressure, for example, measured by various sensors. The ballistic solution generated by the ballistic computer may then be displayed in various forms by a display unit to the shooter.

Various known targeting display devices generate a digitally reproduced image of a target, and overlay targeting information on the digitally reproduced image. A notable disadvantage of this design is that upon an unintended power failure of the display device, the digitally reproduced image generated by the display device disappears, leaving the shooter unable to view the target directly with the scope. Others have attempted to integrate an entire system into a single optical device or to display limited information. Accordingly, there is a need for improvement to address these and other shortcomings of known firearm-mounted targeting display devices.

SUMMARY

Data input or information displayed to the operator of a given optical system may be provided within the field of view using an optical projection system of the invention, such that the data is provided via a superimposed projected image, emanating from an internal illumination engine, housed within the given optical system. The given optical system (such as a rifle scope, binoculars, spotting scope, etc.) containing the projection system super-imposes data pertaining to the required information such that the operator can accurately define the relationship between said operator and a selected target without loss of continuous visual contact with the target. This data could include measurements of range to target, angle and incline to target, position, ambient temperature, wind velocity, operator position, or any other variables required to define the relationship between operator and target.

The defined relationship between operator and target can then be used for calculating a ballistic solution, logistics solution, aiming point, or any number of other applications where remote target data is required. The projection system allows for selectable on-off visibility that removes all aspects of the data, and data display region, from the FOV, providing superior image clarity and a fully unobstructed FOV for the operator as desired.

Use of the disclosed projection system allows for the data image to be composed of one or more micrometer sized pixels, providing the smallest possible obscuration within the FOV, which can also be freely positioned across a large portion of the FOV. This is a substantial departure from other systems such as fixed-location, large obscuration 7-segment digital displays. The projection system is capable of displaying data information in the form of any combination of one or more pixels such as alphanumeric characters, shapes, or symbols, for example. The projection system allows for the use of a single micro-display panel to produce images in any combination of red, green, or blue within the visible spectrum, as well as the potential to produce images in infrared (IR) or ultraviolet (UV) wavelengths, allowing for use with night vision goggles. The projection system may also enable manual or automatic adjustments to display intensity.

Other aspects, features, benefits, and advantages of the present invention will become apparent to a person of skill in the art from the detailed description of various embodiments with reference to the accompanying drawing figures, all of which comprise part of the disclosure.

BRIEF DESCRIPTION OF THE DRAWINGS

Like reference numerals are used to indicate like parts throughout the various drawing figures, wherein.

DETAILED DESCRIPTION

Figure 1:
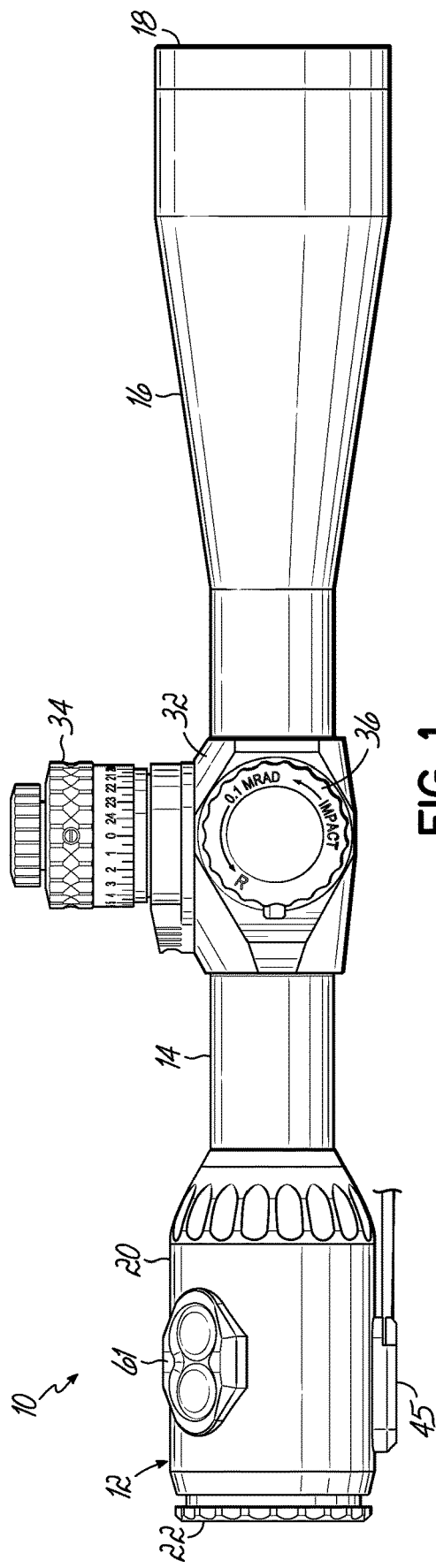
FIG. 1 is a side view of a sighting scope having an integrated optical projection system according to an exemplary embodiment of the invention.

With reference to the drawing figures, this section describes particular embodiments and their detailed construction and operation. Throughout the specification, reference to "one embodiment," "an embodiment," or "some embodiments" means that a particular described feature, structure, or characteristic may be included in at least one embodiment. Thus appearances of the phrases "in one embodiment," "in an embodiment," or "in some embodiments" in various places throughout this specification are not necessarily all referring to the same embodiment. Furthermore, the described features, structures, and characteristics may be combined in any suitable manner in one or more embodiments. In view of the disclosure herein, those skilled in the art will recognize that the various embodiments can be practiced without one or more of the specific details or with other methods, components, materials, or the like. In some instances, well-known structures, materials, or operations are not shown or not described in detail to avoid obscuring aspects of the embodiments.

Figure 2:
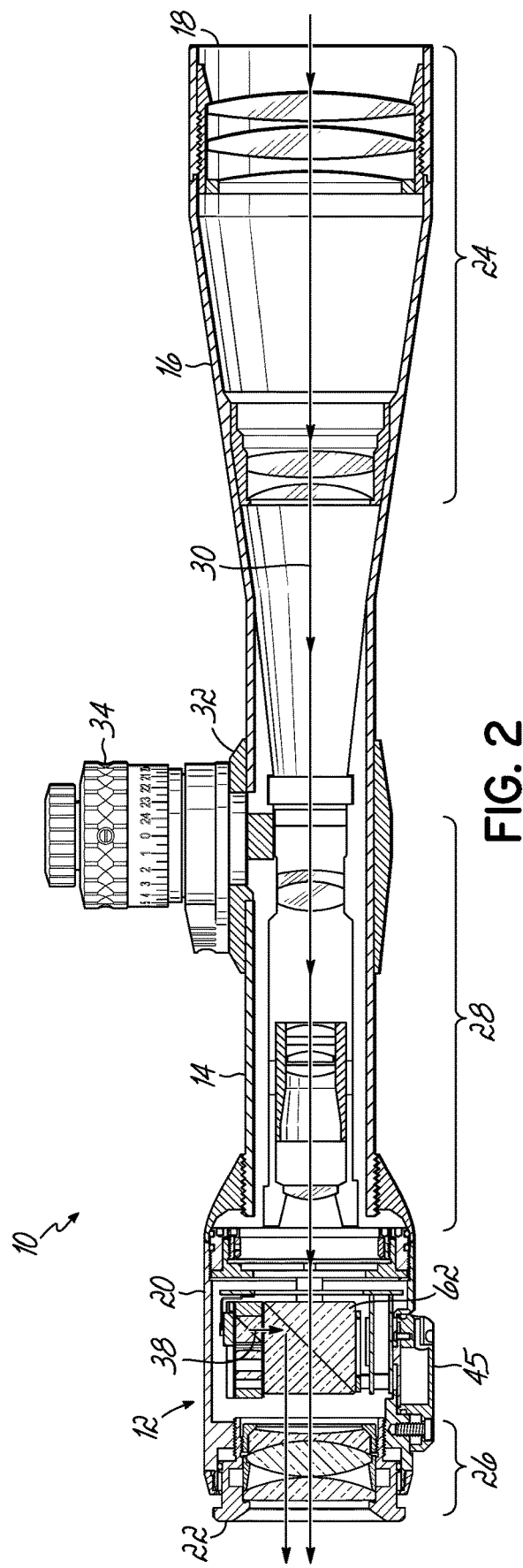
FIG. 2 is a partially cut-away, longitudinal sectional side view of the firearm scope, schematically showing light beams traveling through the scope from a distant target object to form an optical target image, and being combined with light beams directed from the optical projection system to form a data image, the combined light beams forming a sight picture visible to a shooter through the scope eyepiece.
Figure 2A:
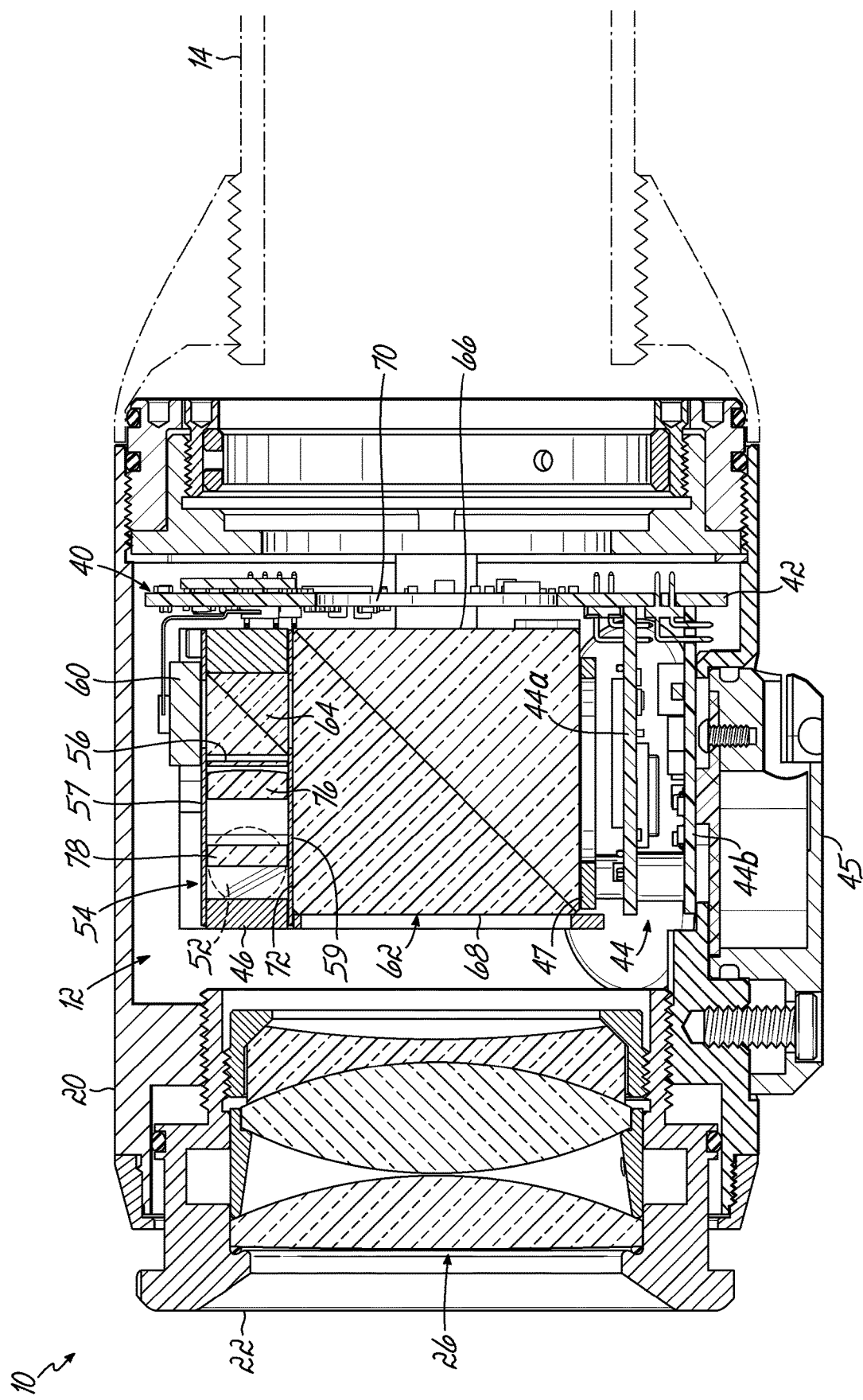
FIG. 2A is an enlarged, sectional view of the optical projection system of the embodiment shown in FIG. 2.
Figure 2B:
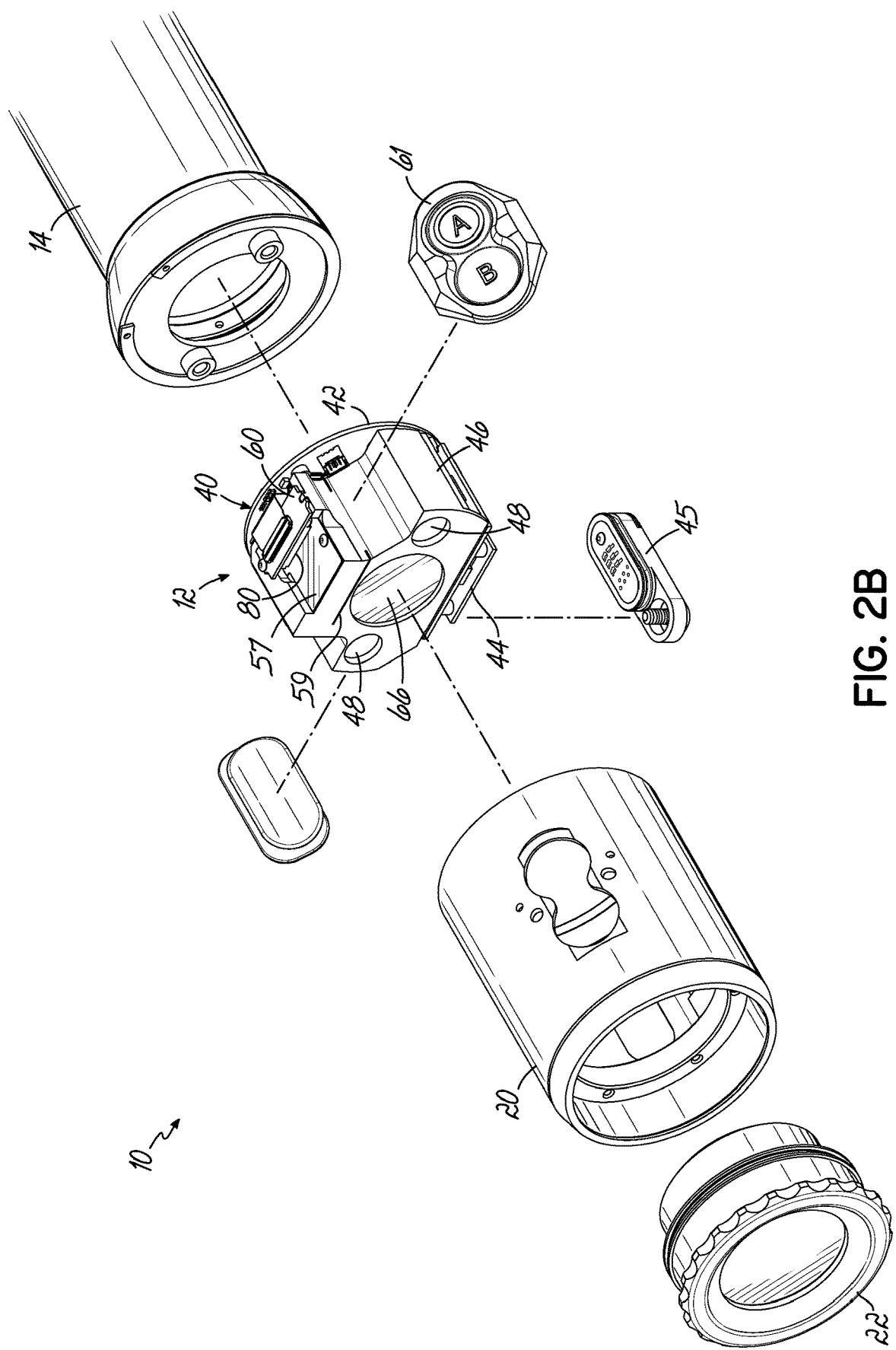
FIG. 2B is a partially exploded isometric view of the optical projection system embodiment.

Referring now to the various figures of the drawing, and beginning with FIGS. 1 and 2, a telescopic firearm sight (i.e., scope) 10 including an integrated optical projection system 12 according to an exemplary embodiment of the invention is shown. The scope 10 as shown is suitable for use with a rifle, for example. In alternative embodiments, the optical projection system 12 may be integrated within a scope configured for use with various other types of weapons or in a spotting scope separate from a firearm.

The scope 10 has a body that includes a scope tube 14 having a length extending along a longitudinal scope axis (optical axis), an objective bell 16 extending distally from the scope tube 14 and defining a first ("objective") end 18 of the scope 10, and an eyepiece 20 extending proximally from the scope tube 14 and defining a second ("eyepiece" or "ocular") end 22 of the scope 10. As shown in FIG. 2, the scope 10 houses an optical magnification system along an optical path that allows a shooter to observe distant target objects, and includes three major assemblies: an objective lens assembly 24, an ocular lens assembly 26, and an optical element assembly 28, further described below.

Referring to FIG. 2, the objective lens assembly 24 is housed within the objective bell 16 proximate the first end 18 of the scope 10 and is configured to create an optical image of a distant target object. In the embodiment shown, the objective lens assembly 24 includes first and second objective lens elements axially spaced from one another. The ocular lens assembly 26 is housed within the eyepiece 20 proximate the second end 22 of the scope 10, and is configured to present to the shooter the optical image of the distant target object created by light gathered through the objective lens assembly 24. In the embodiment shown, the ocular lens assembly 26 includes an ocular lens element. The optical element assembly 28 is housed within the scope tube 14 and a portion of the objective bell 16, between the objective lens assembly 24 and the ocular lens assembly 26, and is configured to manipulate the optical image created by the objective lens assembly 24 before presenting the optical image to the shooter through the ocular lens assembly 26. In the embodiment shown, the optical element assembly 28 includes a collector element, an erector element, and a reticle piece, all of well-known construction. The reticle piece can include a physical reticle that is viewable by the shooter when the shooter views the optical image presented by the ocular lens assembly 26.

As shown schematically in FIG. 2, the three optical assemblies 24, 26, 28 of the scope 10 cooperate generally as follows. Light beams 30 emanating from a distant target object are directed into the objective lens assembly 24, which creates an optical image of the distant target object focused at a first focal plane. The collector element collects these light beams 30 and directs them toward the erector element. The erector element causes the optical image to be inverted and magnified, and causes the light beams 30 to be focused at a second focal plane. Advantageously, the reticle piece may be positioned at the same location as the second focal plane such that the optical image formed there is at the same focal distance from the ocular lens assembly 26. Alternatively, the reticle piece may be positioned at the same location as the first focal plane. The shooter looks through the ocular lens assembly 26, via the eyepiece 20, to view the optical image of the distant target object along the optical path in combination with the reticle, which appears superimposed on the optical image.

As shown in FIGS. 1 and 2, the scope tube 14 includes a saddle portion 32 that supports one or more adjustment knobs or turrets 34 that may be rotated to adjust internal optical components of the scope 10, as desired. In the embodiment shown, the scope 10 includes an elevation adjustment turret 34 that may be rotated to selectively adjust a vertical position of the reticle piece relative to the optical image, and a windage adjustment turret 36 that may be rotated to selectively adjust a lateral position of the reticle piece relative to the optical image.

As shown schematically in FIG. 2, the optical projection system 12 can be integrated within, or otherwise coupled directly to, the eyepiece 20 and/or scope tube 14 of the firearm scope 10. As described in greater detail below, the optical projection system 12 generates a digital data image, represented in FIG. 2 by arrow 38, and projects the data image 38 through a series of prisms with coated surfaces (generally referred to as a "beamsplitter," even when operating, as here, to combine beams of light) so as to combine the data image 38 with an optical target image, represented in FIG. 2 by arrow 30, generated by the objective lens assembly 24. More specifically, the optical projection system 12 superimposes the digital data image 38 onto the optical target image 30, and the combined images 30,38 are presented to a shooter through the eyepiece 20. In this manner, an optical path extends directly between the distant target object and the eye of the shooter, with minimal disruption of the field of view by the digital data image 38 being superimposed by the optical projection system 12 onto the optical target image 30.

Advantageously, projection of the digital data image 38 generated by the optical projection system 12 may be selectively activated and deactivated by the shooter/spotter as desired. For example, the projection system 12 may be placed in an ON mode in which the digital data image 38 is generated and projected into the field of view (or sight picture) visible to the shooter through the eyepiece 20. Alternatively, the projection system 12 may be placed in an OFF mode in which generation and/or projection of the digital data image 38 into the sight picture is deactivated, such that the sight picture viewed by the shooter through the eyepiece 20 presents only the optical image 30 of the distant target object, optionally in combination with a physical reticle image. Accordingly, a total failure of the projection system 12, such as by loss of electrical power, will default to a fully functional, traditional riflescope with a manually adjustable, physical reticle.

Referring to FIGS. 2A and 3-7, features of the optical projection system 12 are shown in greater detail. As shown best in FIGS. 4-6C, the optical projection system 12 includes a circuit board assembly 40 that is situated as a frame-like structure in the optical projection system 12. The circuit board assembly 40 includes an upper circuit board portion 42 that extends generally vertically, and lower circuit board portions 44a, 44b that are coupled to and extend generally horizontally and outwardly from a rear face of the upper circuit board portion 42. As shown, the lower circuit board portion may include first and second levels 44a, 44b. For example, the first of the lower circuit boards 44b may be dedicated, for example, to regulating a supply of electrical power provided by an external power source (not shown), such as via a cable with a detachable connector 45. The second of the lower circuit boards 44a may be dedicated, for example, to circuits for the ballistic solution processor and data memory. The upper circuit board portion 42 can be formed with a generally circular or "donut" shape so as to be received within the scope 10 in an orientation substantially transverse to the primary optical axis of the scope 10 and to generally conform to an inner wall of the scope housing with a central opening. This circuit board portion 42 may include circuits dedicated to generating the graphic data display image and driving a micro-display 60. Accordingly, in the embodiment shown, the upper circuit board portion 42 defines, at its center point, a longitudinal axis along which the optical projection system 12 extends, which axis aligns coaxially with the scope's optical axis. This novel construction allows the circuitry to be contained within a housing having a smaller sectional and axial profile.

Figure 3A:
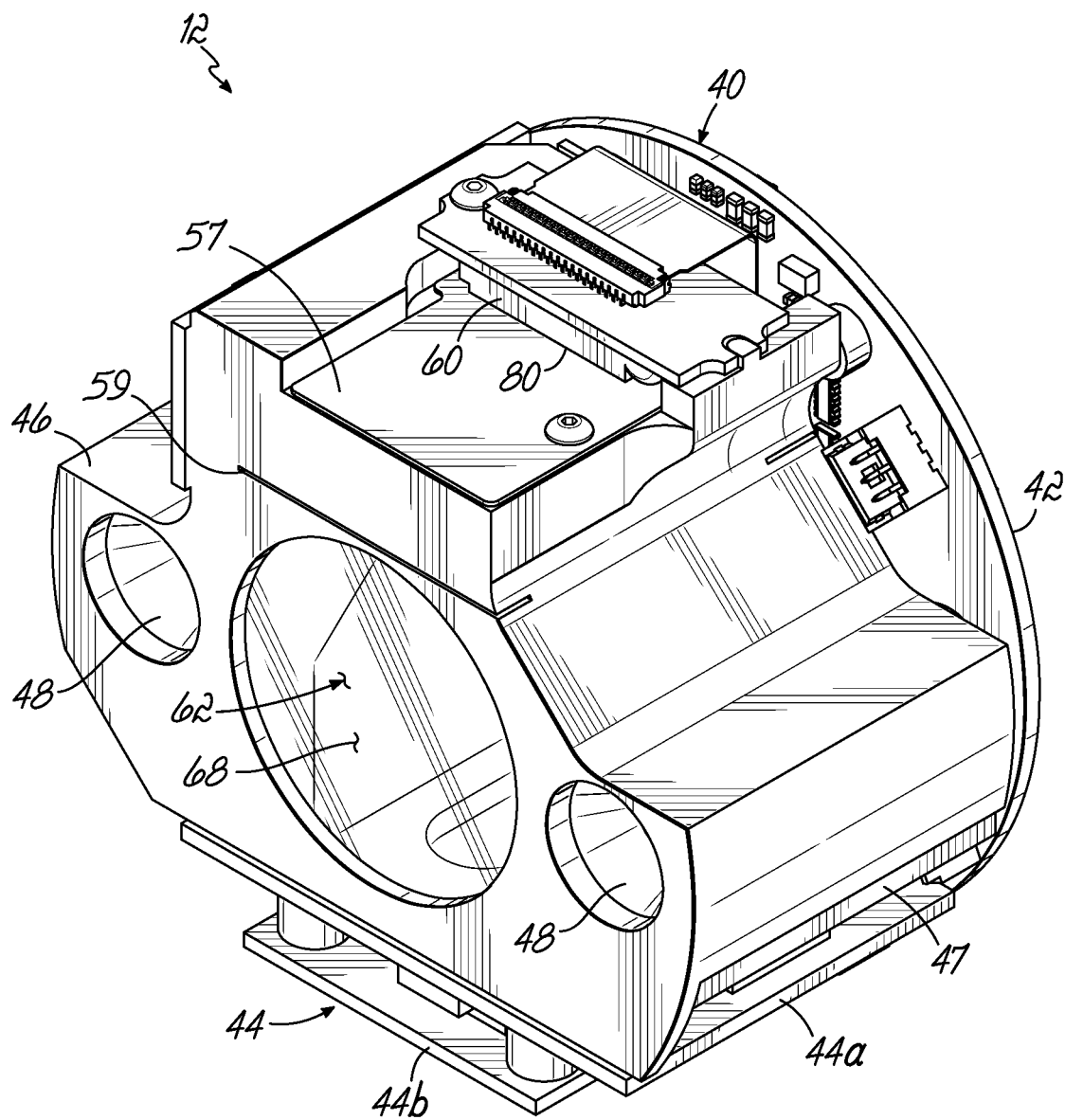
FIG. 3A is a first side isometric view of an optical projection system embodiment, shown with a support element.
Figure 3B:
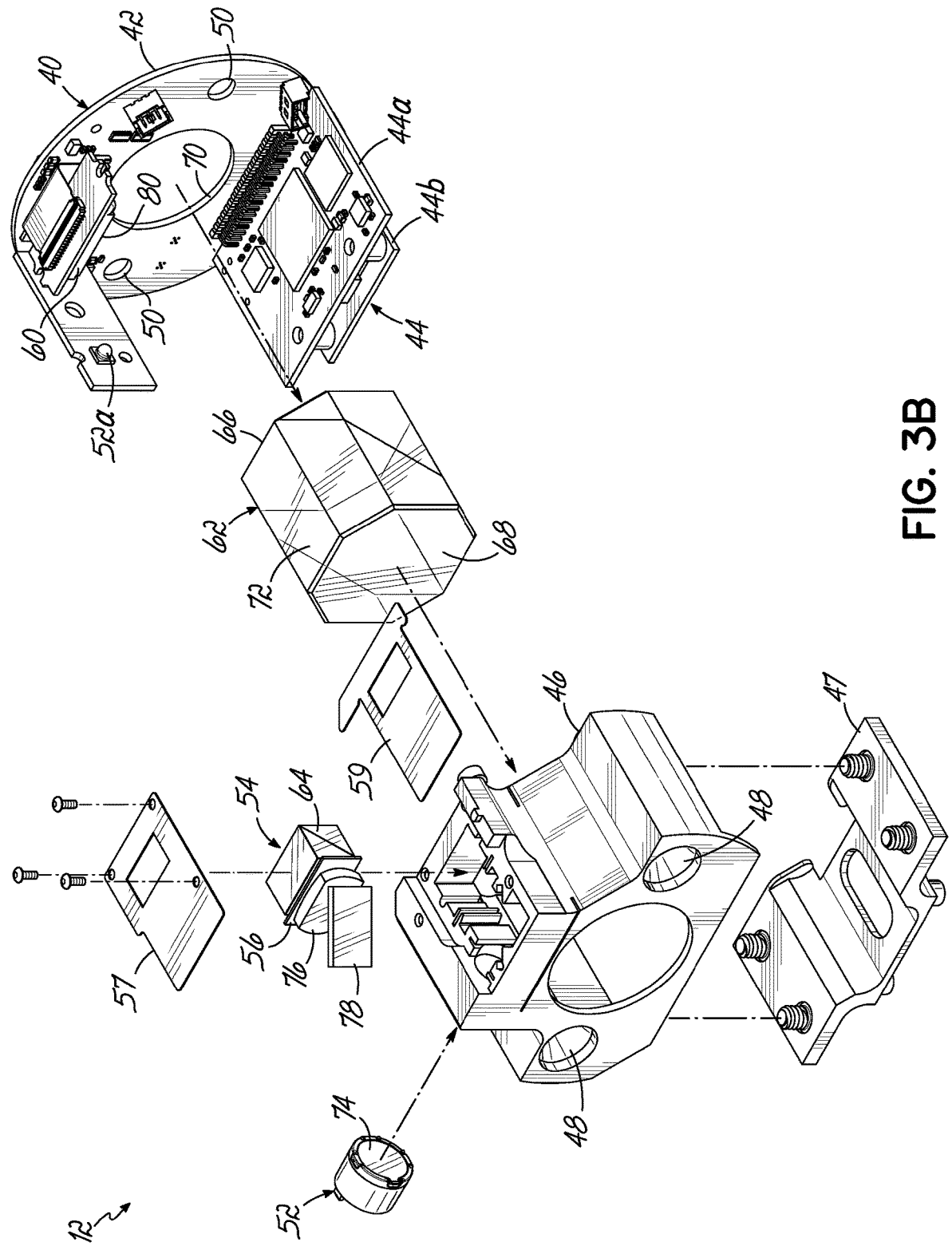
FIG. 3B is a partially exploded isometric view thereof.

As shown in FIGS. 3A and 3B, the support body or elements 46 can couple to the upper circuit board portion 42 via fasteners (not shown) received through bores 48 formed in the support element 46 and openings 50 formed in the upper circuit board portion 42. The support element 46 and bottom support element 47 (in combination with the circuit board assembly 40, if desired) structurally support and protect the optical and electrical imaging components of the optical projection system 12, further described below. The support elements 46, 47 may also function as a heat sink for absorbing and dissipating heat generated by one or more of the display components. As shown, the support element 46 may be formed as a generally circular cylindrical extrusion having various axially and radially extending cut-out features and facets to accommodate corresponding imaging or control components, portions of the circuit board assembly 40, and other internal elements of the firearm scope 10. The bottom support element 47 may be detachably attached with threaded fasteners for ease of assembly and maintenance. The support elements 46, 47 can provide optical unity of the various components to maintain rigidity and critical alignment during the significant and repeated impact of recoil generated by the weapon system to which the scope 10 may be mounted.

In addition to providing a mounting base for certain imaging components of the optical projection system 12, the circuit board assembly 40 functions electronically to assimilate input data and to output graphics to a micro-display 60, described below, for generation of a digital data image. In exemplary embodiments, the circuit board assembly 40 may include direct user input elements, in the form of one or more buttons 61, for example, and may include one or more integrated positional sensors (not separately labeled). Such positional sensors may include a compass and/or a three-axis accelerometer, for example, of well-known design. As described below in connection with FIG. 9, these positional sensors may be employed to provide positional data, corresponding to the scope 10, to the optical projection system 12 and/or ballistic solution computer. The optical projection system 12 may then display the positional data directly or communicate targeting information, derived from the data, such as a ballistic aiming solution, to the shooter via the projected data image 38.

Referring to FIGS. 2A, 3B, and 4-7, the imaging components of the optical projection system 12 generally include at least one illumination source 52a, a focusing lens 52, a corrective optics assembly 54, a linear polarizer element 56, a wave plate 58, a micro-display 60, a primary beamsplitter 62, and a secondary beamsplitter 64. In exemplary embodiments, one or both of the beamsplitters 62, 64 may be polarizing beamsplitters. The primary beamsplitter 62 is situated in the optical path of the scope 10, while the secondary beamsplitter 64 is outside the optical path. The primary beamsplitter 62 may be situated between the ocular and objective lenses 24, 26, as illustrated, or can be in the optical path forward of the objective lens 24 or aft of the ocular lens 26, if desired. Upper and lower shields 57, 59 may be used to contain and isolate the light paths.

In brief summary, and as described in greater detail below in connection with FIG. 7, the illumination source 52 may be an LED 52a that produces a beam of light that is corrected (such as by a collimating or focusing lens 52) and redirected by the corrective optics assembly 54 through the linear polarizer element 56 and into the secondary beamsplitter 64. The secondary beamsplitter 64 then directs the light (by reflection) onto the micro-display 60 to generate a reflected digital data image, which is then projected back down through the secondary beamsplitter 64 (by transmission) and into the primary beamsplitter 62. The primary beamsplitter 62 combines the digital data image (see e.g., arrow 38 in FIGS. 2 and 88 in FIG. 7) with the optical target image (see e.g., arrow 30 in FIGS. 2 and 90 in FIG. 7) collected by the objective lens assembly 24, and the combined images are projected toward the eyepiece 20, through which the combined images may be viewed by a shooter. Structural features and arrangement of the imaging components of the optical projection system 12 are described in greater detail below.

Referring to FIGS. 2A and 4-6C, the primary beamsplitter 62 is shown shaped as an octagonal prism having an entry end face 66 and an opposed exit end face 68, and being supported by the support element 46 so as to extend along the scope axis. The primary beamsplitter 62 could have a cube shape, but portions unnecessary to the size and placement of the light beams and images can be eliminated to reduce size, weight, and cost, producing a polygonal (or cylindrical) axial profile. The entry end face 66 may be positioned adjacent to a circular central opening 70 formed in the upper circuit board portion 42, which opening 70 accommodates the optical path extending through the scope 10 along the scope axis. Accordingly, the optical target image gathered by the objective lens assembly 24 is directed through the central opening 70 and into the primary beamsplitter 62 via the entry end face 66. Within the primary beamsplitter 62, the optical target image is combined with a digital data image generated by the micro-display 60, as described in greater detail below.

The primary beamsplitter 62 may be oriented about the scope axis such that an upper face 72 extends generally horizontally. As shown, the corrective optics assembly 54, linear polarizer element 56, wave plate 58, micro-display 60, and secondary beamsplitter 64 are supported generally at or above the upper face 72. For example, the secondary beamsplitter 64 may be supported directly on the upper face 72, as described below.

The illumination source 52 is shown in the form of a light emitting diode (LED) light source 52a, which may utilize an operational wavelength (or a combination of multiple wavelengths) within known visual bands (e.g., 350-700 nm). In one embodiment, the illumination source 52 may be in the form of a red LED light source. In alternative embodiments, the illumination source 52 may be of various other types known in the art, and may utilize light wavelengths within known UV or IR bands, for example. As such, the data image generated by the optical projection system 12 may be viewable with a night vision imaging device, such as night vision goggles worn by a shooter/spotter, or with various thermal imaging devices, for example. In the illustrated embodiment, the illumination source 52 is supported with the corrective optics assembly 54 generally above the primary beamsplitter 62, and both are laterally offset from the upper face 72 thereof.

The corrective optics assembly 54 of the illustrated embodiment includes a total internal reflection (TIR) lens 74, a field lens 76, and a reflective element 78. In an exemplary embodiment, the field lens 76 may be in the form of a plano-convex (PCX) lens. Additionally, while the reflective element 78 is shown in the form of a mirror plate, in alternative embodiments the reflective element 78 may be of various other suitable types and shapes.

In the embodiment shown, the TIR lens 74 is positioned adjacent to the illumination source 52 and faces transverse to the longitudinal axis of the optical projection system 12. The field lens 76 is positioned generally perpendicular to the TIR lens 74, and the mirror plate 78 is positioned angularly between the TIR lens 74 and the field lens 76 so as to redirect light from the TIR lens 74 to the field lens 76. The mirror plate 78 may be oriented at any suitable angle relative to the TIR lens 74, such as approximately 45 degrees, for example. The TIR lens 74, field lens 76, and mirror plate 78 of the corrective optics assembly 54 cooperate to shape light emitted by the LED light source 52 into a corrected beam profile that generally matches a beam profile of the optical image to be directed through the scope 10 from the objective lens assembly 24. In that regard, the TIR lens 74 captures and collimates and/or focuses light emitted by the LED light source 52, and redirects the focused light toward the mirror plate 78, which in turn redirects the light through the field lens 76.

The use of corrective optics within the optical projection system 12 advantageously enables precise control of display focus and parallax within a field of view presented to a shooter through the scope eyepiece 20. By properly matching the beam profile of light emitted by the illumination source 52 with a beam profile of light directed through the scope 10 from the distant target object, the projection system 12 maximizes its performance efficiency, thereby maximizing the life of a power source (e.g., battery) for the projection system 12, while providing a data image of optimum visual quality. Further, to a shooter/spotter looking through the scope eyepiece 20, the data image generated by the projection system 12 appears to be flat and parallax free, similar to the reticle. Additionally, the projection illumination technique employed by the projection system 12, in combination with the corrective optics assembly 54, allows for delivery of a majority of the light rays generated by the illumination source 52 to the shooter/spotter's eye, thereby providing an enhanced data image relative to conventional targeting display devices in which the shooter directly views a backlit type display, for example.

The secondary beamsplitter 64 is spaced from the field lens 76 by a linear polarizer element 56, which may be in the form of a wire grid style linear polarizer, for example. In combination, the secondary beamsplitter 64, the linear polarizer element 56, and a wave plate 58 (described below) define a polarization-control optics assembly that improves efficiency and contrast of the digital data image produced by the optical projection system 12.

Referring to FIGS. 3B-6C (and schematically in FIG. 7), the secondary beamsplitter 64 is shown shaped as a rectangular prism having a primary optical axis oriented generally transverse (vertical) to the longitudinal axis along which the primary beamsplitter 62 extends. The secondary beamsplitter 64 linearly polarizes light passing therethrough, and functions to direct light from the linear polarizer element 56 to the micro-display 60, and reflect from the micro-display 60 to the primary beamsplitter 62 transverse to the primary optical axis of the primary beamsplitter 62. Accordingly, the secondary beamsplitter 64 may be formed with a width (in this case longer than its optical axis length) suitable to span substantially a full width of a display screen 80 of the micro-display 60 and supported above the secondary beamsplitter 64. Opaque shields 57, 59 contain and separate the light paths of the light source 52, 52a, micro-display 60, and secondary beamsplitter 64 from the primary beamsplitter 62 and outside environment.

The secondary beamsplitter 64 may be oriented such that a lower face thereof abuts the upper face 72 of the primary beamsplitter 62, and an upper face of the secondary beamsplitter 64 is directed toward the micro-display 60. As shown in FIG. 7B, the wave plate 58 may be positioned between the micro-display 60 and the upper face of the secondary beamsplitter 64. A first side face of the secondary beamsplitter 64 confronts the linear polarizer element 56.

After light generated by the LED light source 52 (reflected, in this case, by mirror 76) passes through the field lens 76, it continues through the linear polarizer element 56, which restricts a polarization state of the light. Upon exiting the linear polarizer element 56, the light enters the secondary beamsplitter 64 through a side face thereof, and is reflected at least in part by the secondary beamsplitter 64 in a direction toward the micro-display 60. Before reaching the micro-display 60, the linearly polarized light passes through the wave plate 58, which may be in the form of a quarter wave plate, for example. The wave plate 58 functions as an optical retarder (or "compensator") to alter the polarization state of the light and thereby improve image contrast of the data image ultimately produced using the micro-display 60. In alternative embodiments, the wave plate 58 may be omitted and a compensator may be integrated within the micro-display 60, for example.

Polarization control provided by the secondary beamsplitter 64, the linear polarizer element 56, and the wave plate 58 advantageously enhances the data image generated by the micro-display, described below. In particular, polarization control provides the data image with optimal image contrast and brightness, and provides optimum control of stray light noise, thereby maximizing image quality of the data image.

Figure 4:
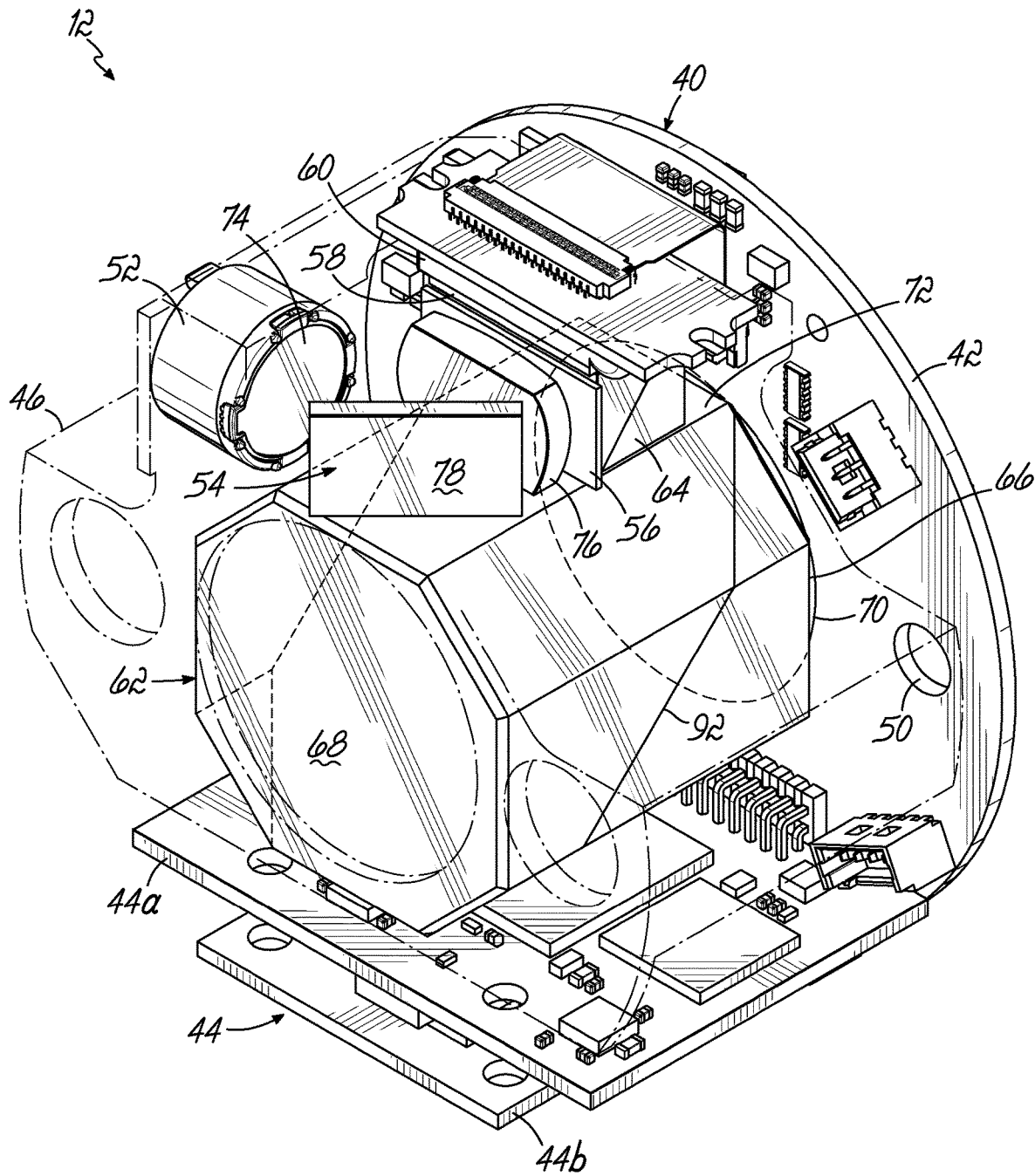
FIG. 4 is a view of the optical projection system similar to FIG. 3A, shown without the support element.
Figure 5:
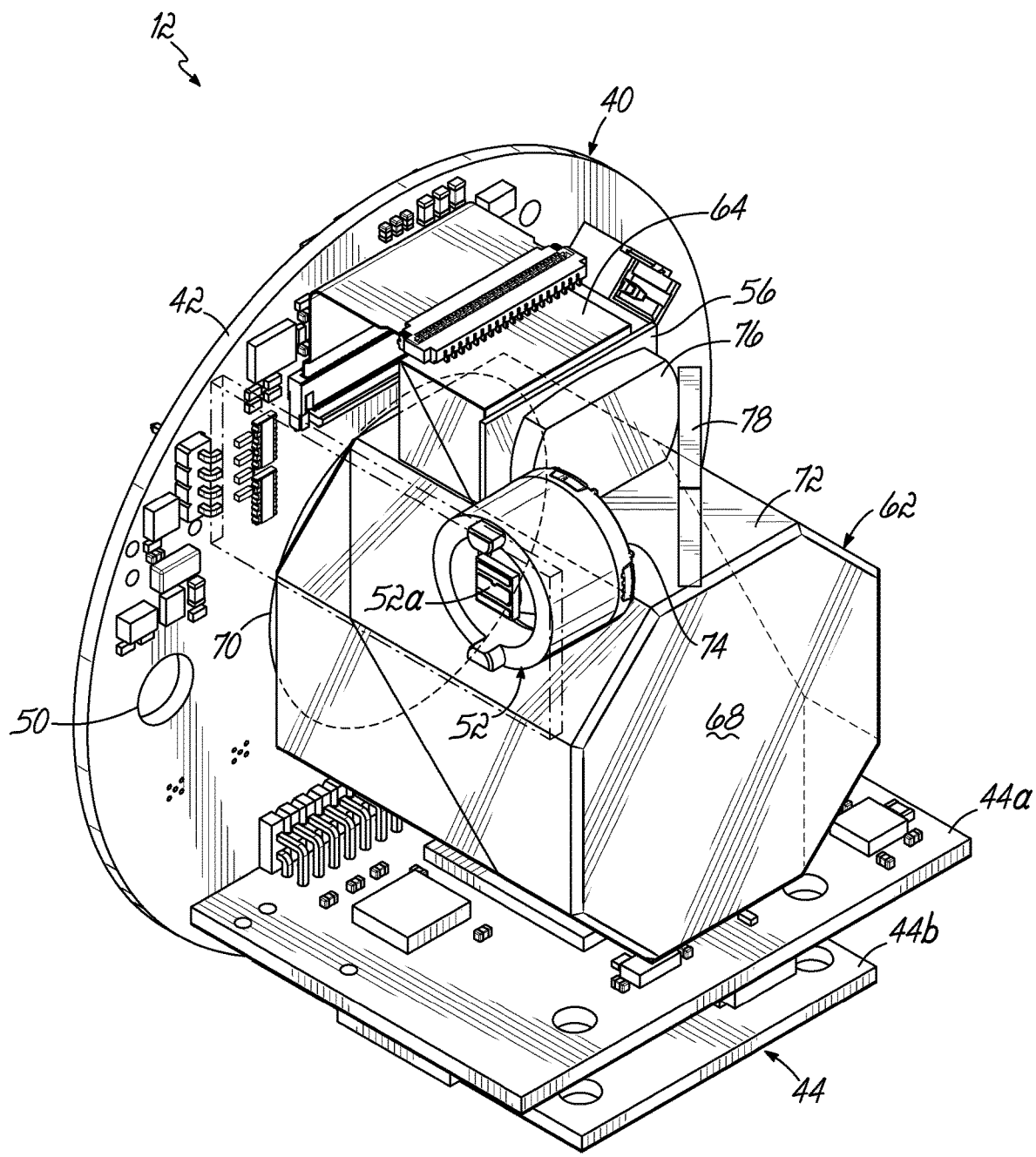
FIG. 5 is a second side isometric view thereof with the micro-display omitted for clarity.
Figure 6B:
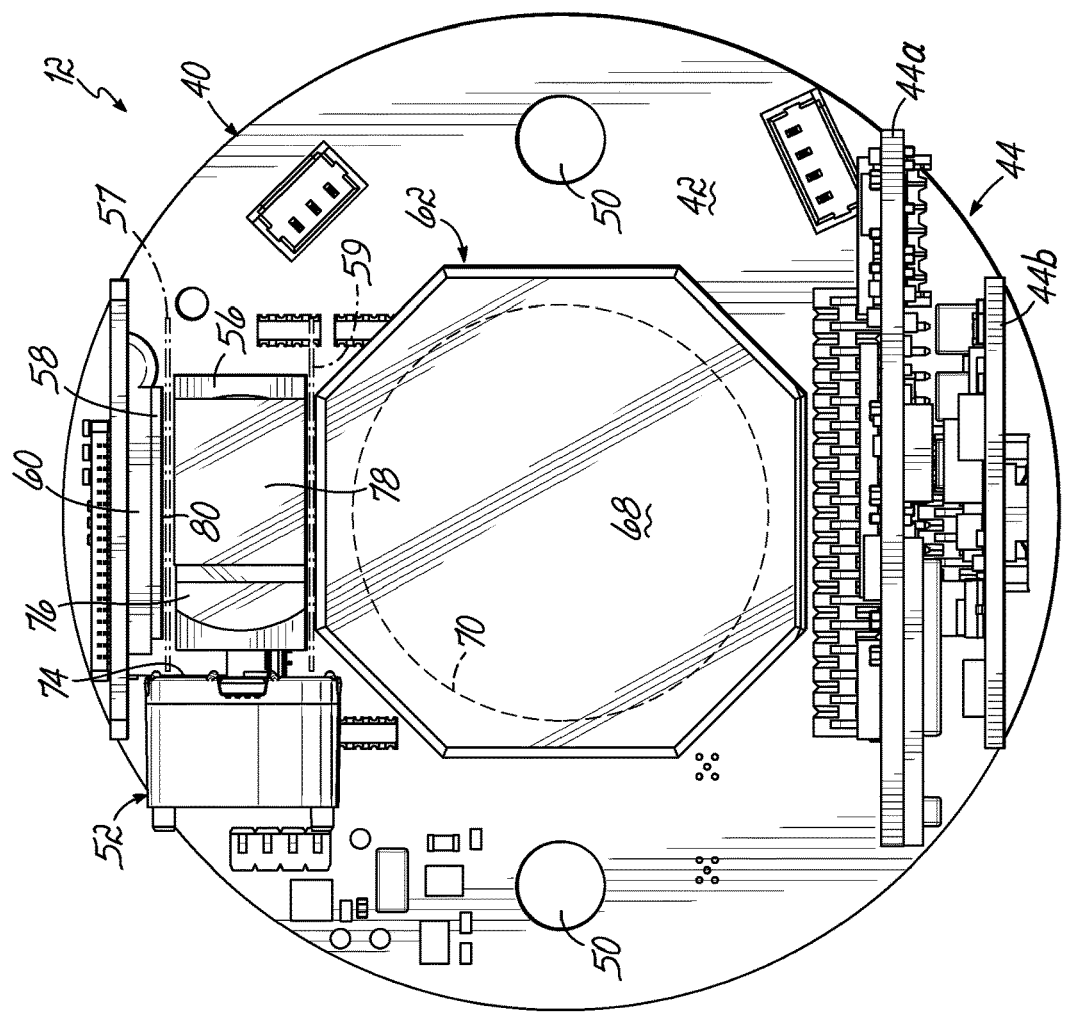
FIG. 6B is a rear elevation view thereof.
Figure 6A:
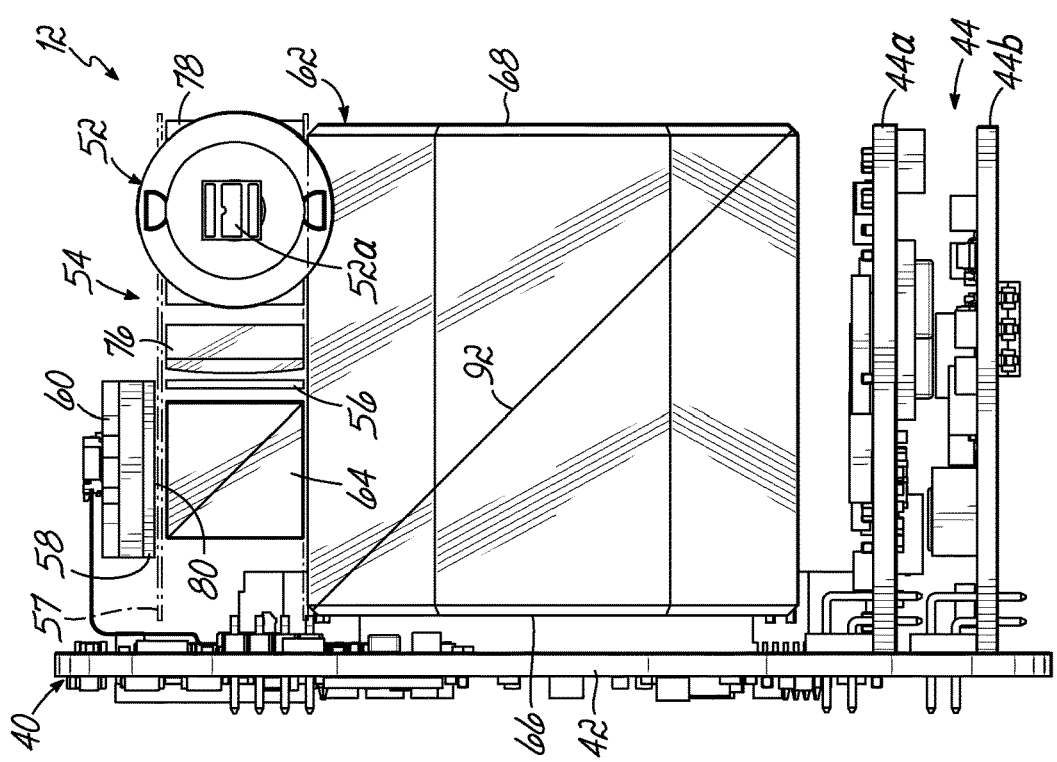
FIG. 6A is a first side elevation view thereof.
Figure 6C:
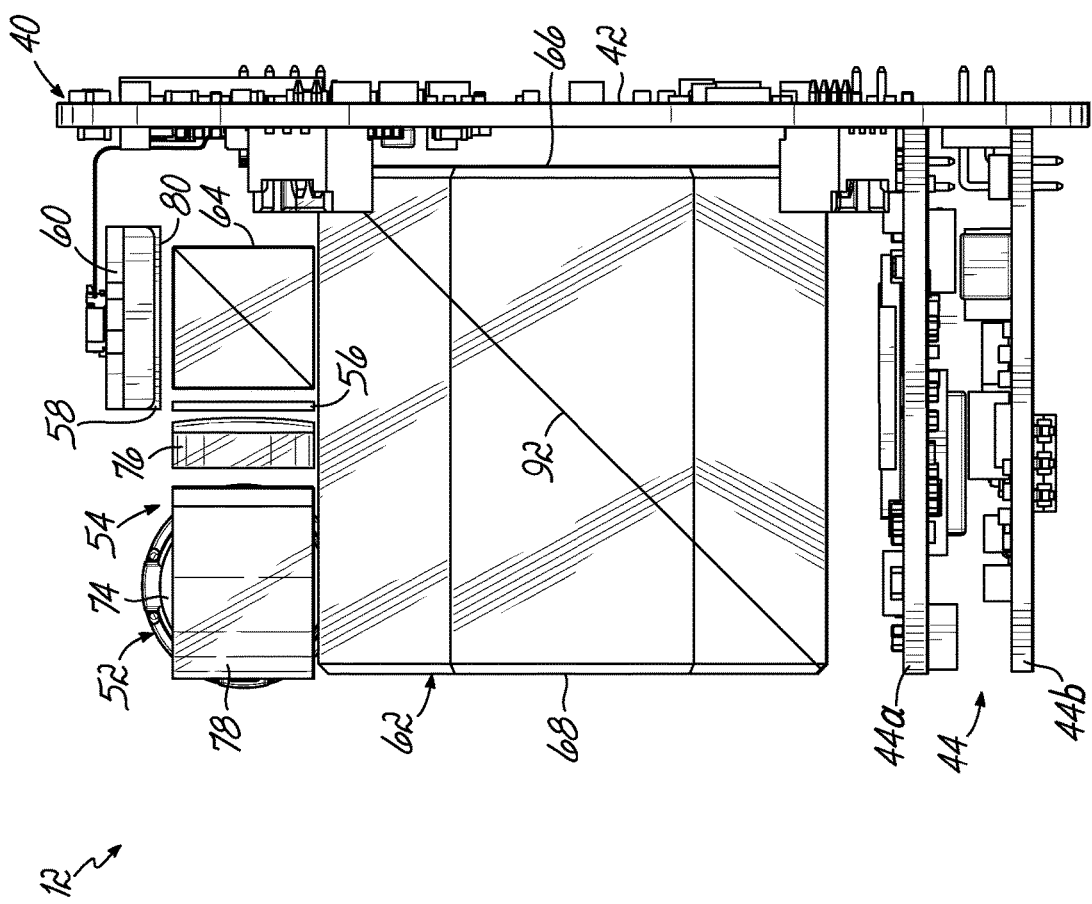
FIG. 6C is a second, opposite side elevation thereof.

As best shown in FIGS. 4, 6A, and 6C, the micro-display 60 may be supported directly above the wave plate 58, which can, if desired, abut the upper face of the secondary beamsplitter 64, and includes a screen 80 that faces toward and confronts the wave plate 58. As described above, in an alternative embodiment the wave plate 58 may be omitted such that the screen 80 faces toward and confronts the upper face of the secondary beamsplitter 64. As described in greater detail below in connection with FIG. 7, the micro-display 60 is configured to generate a digital data image that is superimposed by the primary beamsplitter 62 onto the optical target image directed from the objective lens assembly 24.

In exemplary embodiments, the micro-display 60 may be in the form of a reflective liquid crystal on silicon (LCOS) display panel. Advantageously, an LCOS display panel provides benefits including: superior display brightness (intensity) control for use in a variety of lighting conditions; superior display contrast for improved image quality (e.g., darker blacks and whiter whites) for producing a more realistic data image; even pixel illumination for consistent image color and intensity; accurate pixel-by-pixel control without screen mesh image degradation, as may be exhibited by non-LCOS micro-displays such as organic light emitting diode (OLED) displays; and superior pixel density (expressed as pixels per inch or PPI) for superior definition display, such as at least 720P and up to 4K, for example. In exemplary embodiments, an LCOS micro-display may exhibit a pixel size of 9.4 micrometers ($\mu$m) or less, such as approximately 6.4 $\mu$m, for example. In one embodiment, the micro-display 60 may be in the form of an LCOS display panel of a full color HD type, and having a 1024×600 color high brightness resolution. In alternative embodiments, the micro-display 60 may be in the form of various other display types, such as an OLED or a liquid crystal display (LCD), for example.

Figure 7:
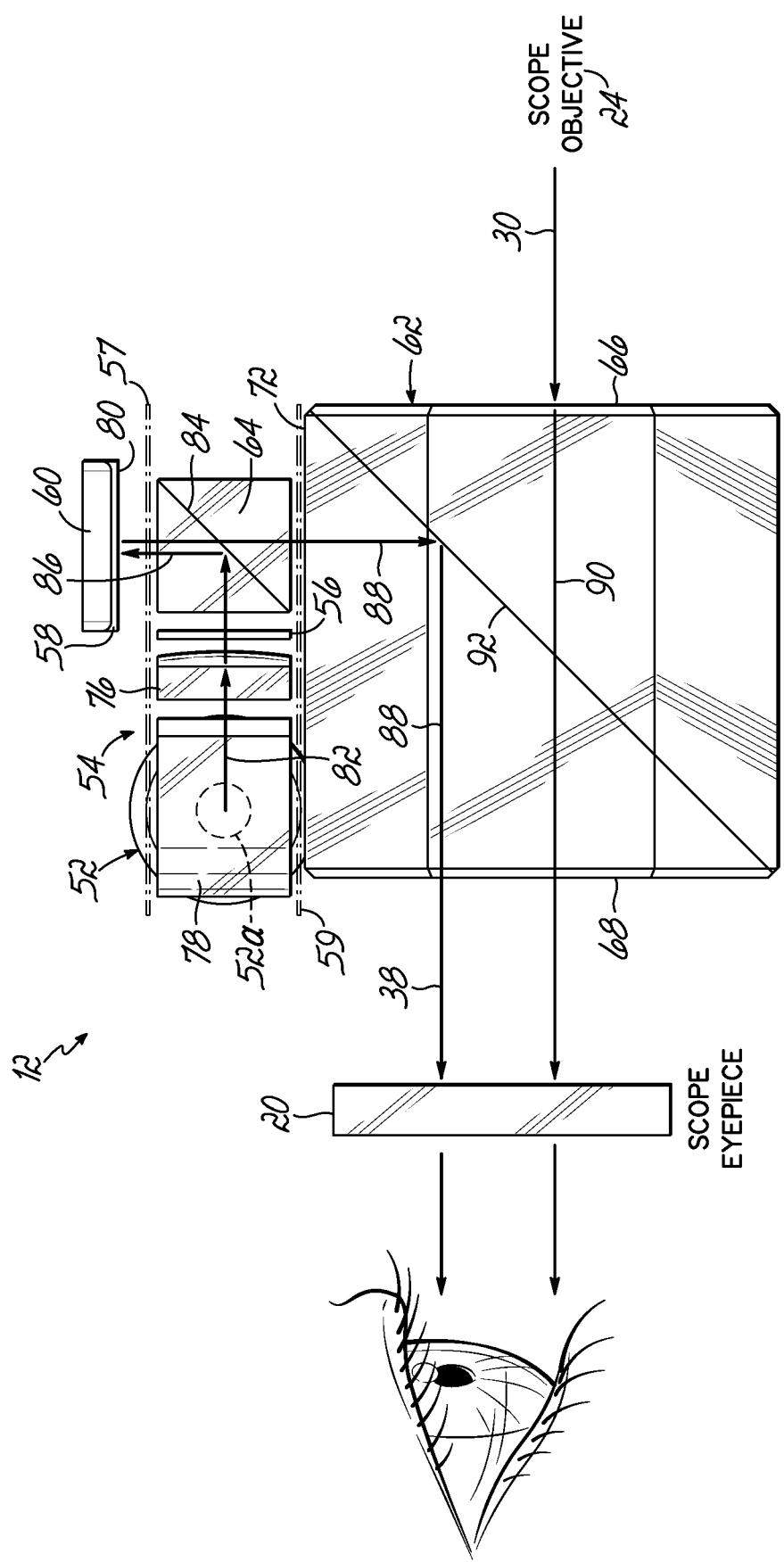
FIG. 7 is a schematic side view of select imaging components of the optical projection system, showing light beams forming an optical target image being combined in a primary beamsplitter with light beams forming a data image to form a sight picture visible to a shooter through the scope eyepiece.

Referring to FIG. 7, a schematic view of light beams traveling through the optical projection system 12 is shown. As indicated by arrow 82, light emitted by the illumination source 52 is directed from the corrective optics assembly 54 and into the secondary beamsplitter 64 through a side face thereof. Within the secondary beamsplitter 64, the emitted light 82 reaches an inner hypotenuse face 84 of the beamsplitter 64, which may allow a selected portion of the emitted light 82 to transmit therethrough (not shown), and a selected portion of the emitted light 82 to reflect upwardly through an upper face of the secondary beamsplitter 64 and toward the micro-display 60, as indicated by first reflection arrow 86. Though not shown in FIG. 7, the reflected light 86 may also pass through the wave plate 58 before reaching the micro-display 60, as described above.

Figure 8:
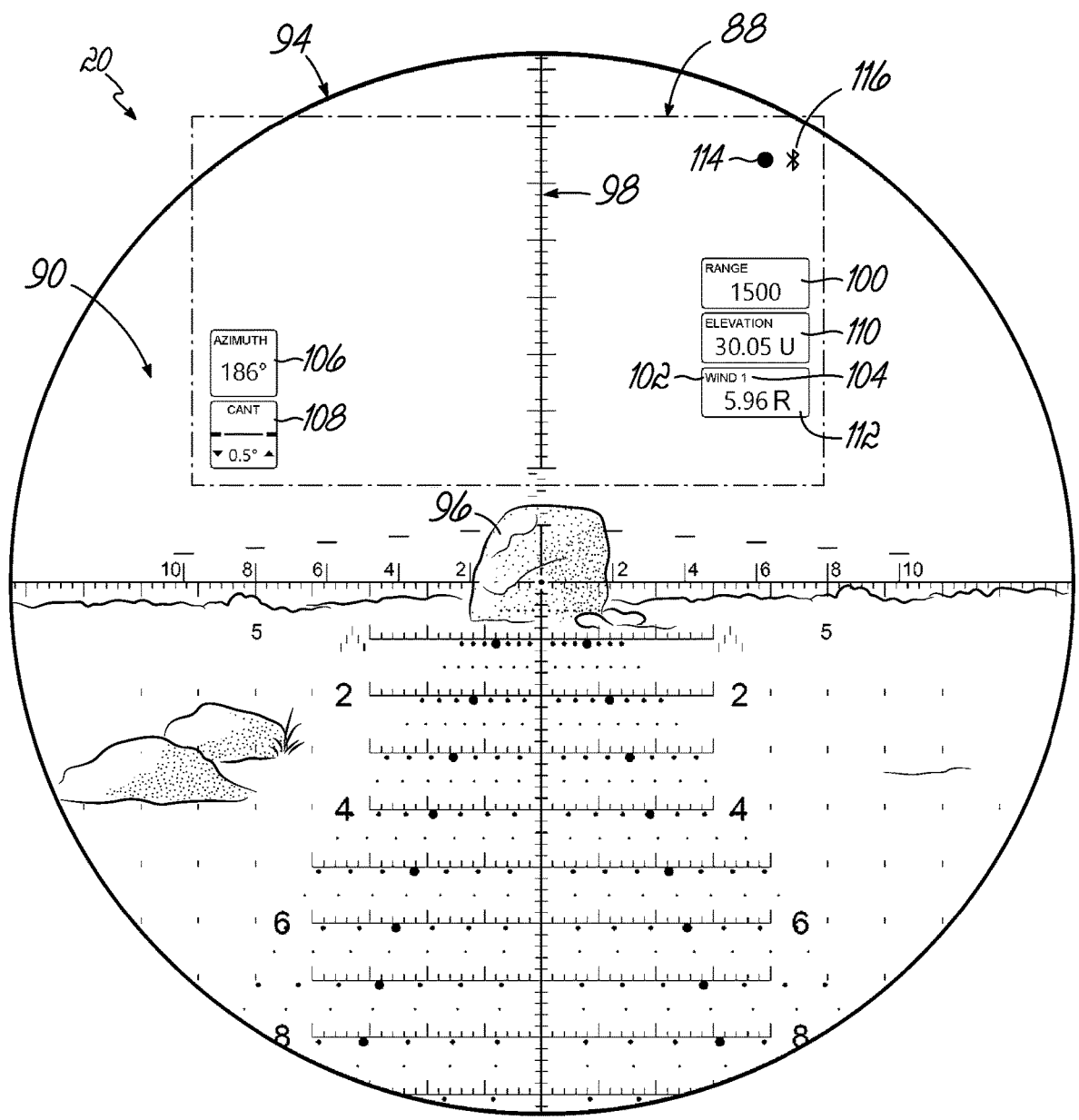
FIG. 8 shows an exemplary sight picture visible to a shooter or spotter through the scope eyepiece at high magnification and presenting an optical target image and a data image super-imposed on the optical target image.
Figure 8A:
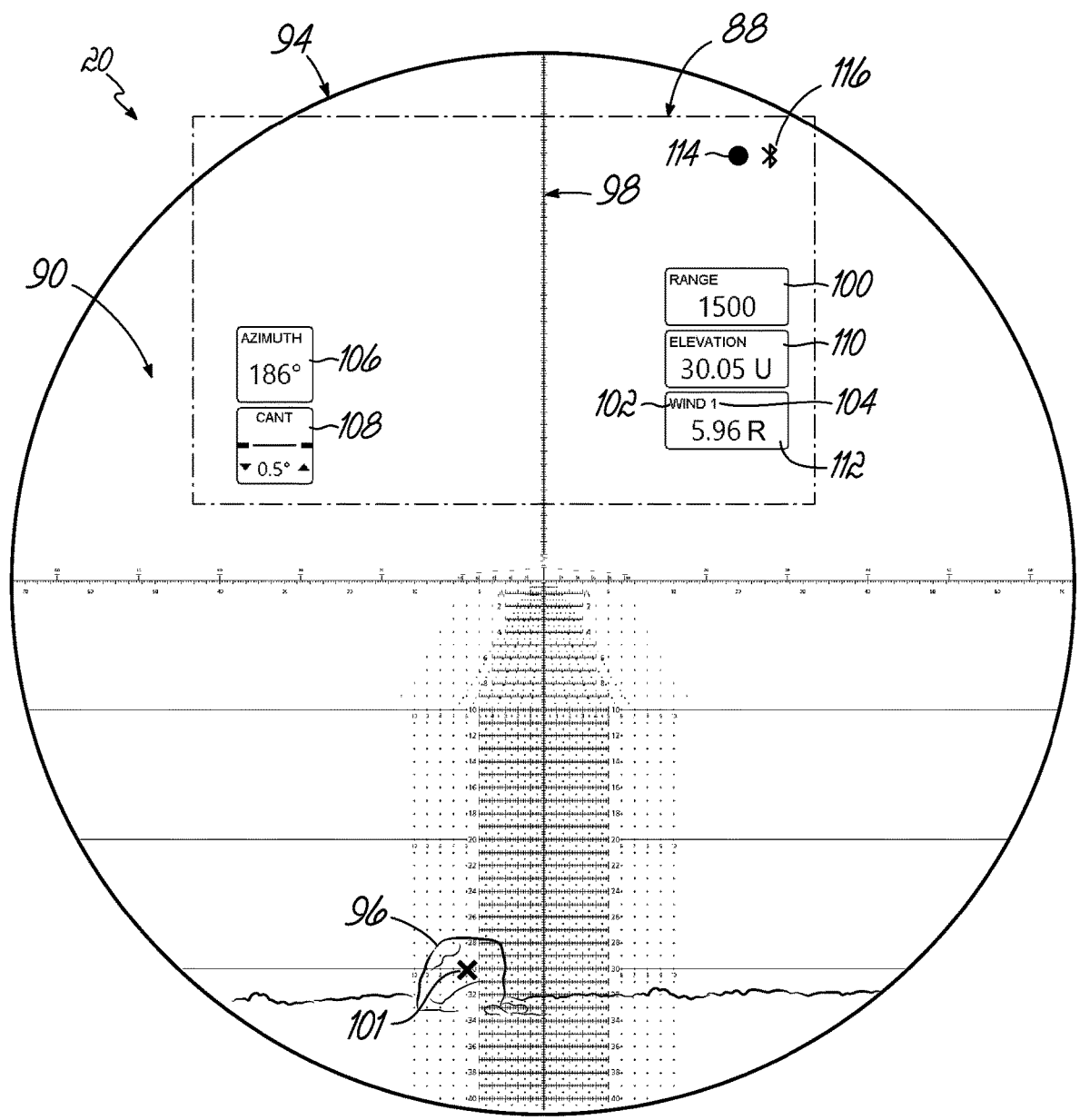
FIG. 8A shows a similar depiction at low magnification and showing a projected aiming point.

The reflected light 86 illuminates the display screen 80 of the micro-display 60, which displays targeting information in the form of one or more data characters (see, e.g., FIGS. 8 and 8A). When illuminated, the display screen 80 of the micro-display 60 reflects light downwardly back through the upper face of the secondary beamsplitter 64, as indicated by second reflection arrow 88. The light reflected by the micro-display 60 defines a data image 88 containing the data characters displayed by the micro-display 60. As shown in FIG. 7, the data image light 88 transmits through the inner hypotenuse face 84 of the secondary beamsplitter 64, and passes through a lower face of the secondary beamsplitter 64 and into the primary beamsplitter 62 through the upper face 72 thereof.

Still referring to FIG. 7, simultaneously with the generation of the data image 88 as described above, light 90 defining an optical image of a distant target object, as gathered by the objective lens assembly 24, travels through the scope 10 in a direction toward the eyepiece 20 and enters the primary beamsplitter 62 through the entry end face 66. Within the primary beamsplitter 62, the optical target image light 90 and the data image light 88 each reach an inner hypotenuse face 92 of the primary beamsplitter 62. As shown, the hypotenuse face 92 may allow the optical target image light 90 to transmit linearly therethrough in a direction toward the eyepiece 20 with very little loss, while simultaneously reflecting a select portion of the data image light 88 in a direction toward the eyepiece 20. In this manner, the primary beamsplitter 62 combines the data image 88 with the optical target image 90, and presents both images 88, 90 to the scope eyepiece 20 simultaneously so as to provide a shooter/spotter with the visual effect of the data image 88 being superimposed on the optical target image 90.

As shown in FIG. 7, the secondary beamsplitter 64 and the micro-display 60, each supported atop the upper face 72 of the primary beamsplitter 62, may be positioned at an entry end portion of the primary beamsplitter 62 so that the data image light 88 reflects upon an upper portion of the inner hypotenuse face 92 of the primary beamsplitter 62. Consequently, as shown in FIGS. 8 and 8A, the data image 88 transmitted to the eyepiece 20 may be superimposed on an upper portion of the optical target image 90 when the images 88, 90 are presented through the scope eyepiece 20. It will be appreciated that the secondary beamsplitter 64, the micro-display 60, and adjoining imagining components of the optical projection system 12 may be selectively positioned relative to the primary beamsplitter 62 to achieve any desired orientation of the data image 88 relative to the optical target image 90. Other focusing lenses or curved (freeform) prism surfaces (not shown) may be used to distribute data image light 88 to any portion of the FOV seen through the scope eyepiece 20.

Though not depicted in FIG. 7, the inner hypotenuse face 92 of the primary beamsplitter 62 may allow a select portion of the data image light 88 to transmit downwardly therethrough. In that regard, the inner hypotenuse faces 84, 92 of the primary and secondary beamsplitters 62, 64 may be suitably configured to provide any desired ratio of light reflection to light transmission. In exemplary embodiments, the primary beamsplitter 62 may be formed with a light reflection to transmission ratio in a range of about 20:80 to about 30:70, and the secondary beamsplitter 64 may be formed with a 50:50 light reflection; transmission ratio.

The inner hypotenuse face 92 of the primary beamsplitter 62, and optionally also the inner hypotenuse face 84 of secondary beamsplitter 64, may include one or more coatings for controlling light reflection and transmission. Exemplary coatings may include various dielectric coatings configured to provide a selected light reflection/transmission ratio, and which may be adapted for polarizing or non-polarizing use. Exemplary coatings may also include various dichroic coatings, configured to provide a selected light reflection/transmission ratio specific to certain wavelengths. Advantageously, a dichroic coating may provide fine control over polarization components across a broad range of light wavelengths. Moreover, use of a dichroic coating may facilitate maximum light transfer through the optical projection system 12 and maximum brightness of the data image 88 generated with the micro-display 60, while by reflecting only the light wavelengths projected from the micro-display 60 in data image light 88.

Exemplary coatings for one or both of the inner hypotenuse faces 84, 92 may also include various metallic coatings, which can include silver or aluminum, for example, configured for use across a wide range of light wavelengths and providing a selected light reflection/transmission ratio. In an exemplary embodiment, the inner hypotenuse face 92 of the primary beamsplitter 62 may include a coating composed of dielectric and silver layers configured to provide approximately 70-80% transmission and approximately 20-30% reflection of the data image light 88 received from the micro-display 60.

Referring to FIGS. 8 and 8A, an exemplary sight picture 94 visible through the scope eyepiece 20 is shown. The sight picture 94 presents the optical target image 90 of a distant target object 96, in combination with a data image 88 and an image of a physical (and/or virtual) reticle 98. The data image 88 is shown superimposed on an upper portion of the optical target image 90 located above a horizontal line of the reticle 98, which may be accomplished with the exemplary structural configuration shown in FIG. 8. In the illustrated embodiment, the reticle 98 may be a physical reticle, typically in the form of crosshairs formed by wires or a reticle pattern etched or otherwise applied to a glass plate according to well-known methods and construction. Alternatively, some or all of a reticle pattern can be projected into the optical path along with the data image 88.

The exemplary data image 88 shown in FIGS. 8 and 8A includes various data characters or symbols for communicating select targeting information to the shooter viewing the sight picture 94. In exemplary embodiments, data characters of the data image 88 may communicate measurements of certain targeting variables, including range to target 100, temperature, pressure, humidity, wind speed 102, wind direction 104, elevation (above sea level), direction of aim (azimuth) 106, and firearm orientation (cant and/or angle of inclination/declination) 108, for example. In other embodiments, the data characters 100 may communicate a ballistic solution 110, 112 that has been determined based upon such targeting variables using select mathematical formulas. If desired, symbols indicating remaining battery life 114 or wireless connectivity 116 may be displayed. Other "drop-down" menus (not shown) may be activated for changing settings (such as brightness, units of measure, etc.), activating or deactivating features (such as connectivity to specific devices), or modes (such as calibration, sleep, input, etc.).

A ballistic solution may be presented by the data image 88 in the form of one or more values indicating a respective number of turret adjustment clicks, minutes of angle (MOA), or milliradians (MRAD), for example, by which shooters must correct their aim, for example by adjusting the elevation and/or windage adjustment turrets 34, 36, to hit the target object 96. In the illustrated example (FIGS. 8 and 8A), the ballistic adjustment is shown to be 30.05 UP (shown at 110) and 5.96 RIGHT (shown at 112). This can be an instruction to either adjust the reticle settings or to find the aim point on the reticle grid that corresponds to these adjustments. In another embodiment, the image data may convey to the shooter the intersection (vertical and horizontal) values 110, 112 or a projected point (101 in FIG. 8A) on a grid-type reticle to which the shooter must adjust his or her aim to hit the target.

In other embodiments, the ballistic solution presented by the data image 88 within the sight picture 94 may include an image or a video of a corrected aim point, displayed in the form of a projected point or, for example, an auxiliary aiming reticle 101 (shown in the low magnification view of FIG. 8A) that indicates a predicted elevation and/or lateral location of a projectile impact point on the target object 96. The predicted impact point may be determined based on a trajectory calculated from the targeting variables described above. In exemplary embodiments, the corrected aim point may be automatically and dynamically repositioned within the sight picture 94, relative to the optical target image 90 (and relative to a physical and/or projected reticle pattern), in response to changes in one or more of the targeting variables, such as firearm orientation or target distance.

In other exemplary embodiments of the invention, the optical projection system 12 may be suitably configured so that the sight picture 94 presented within the scope eyepiece 20 includes thermal and/or night vision overlays.

Figure 9:
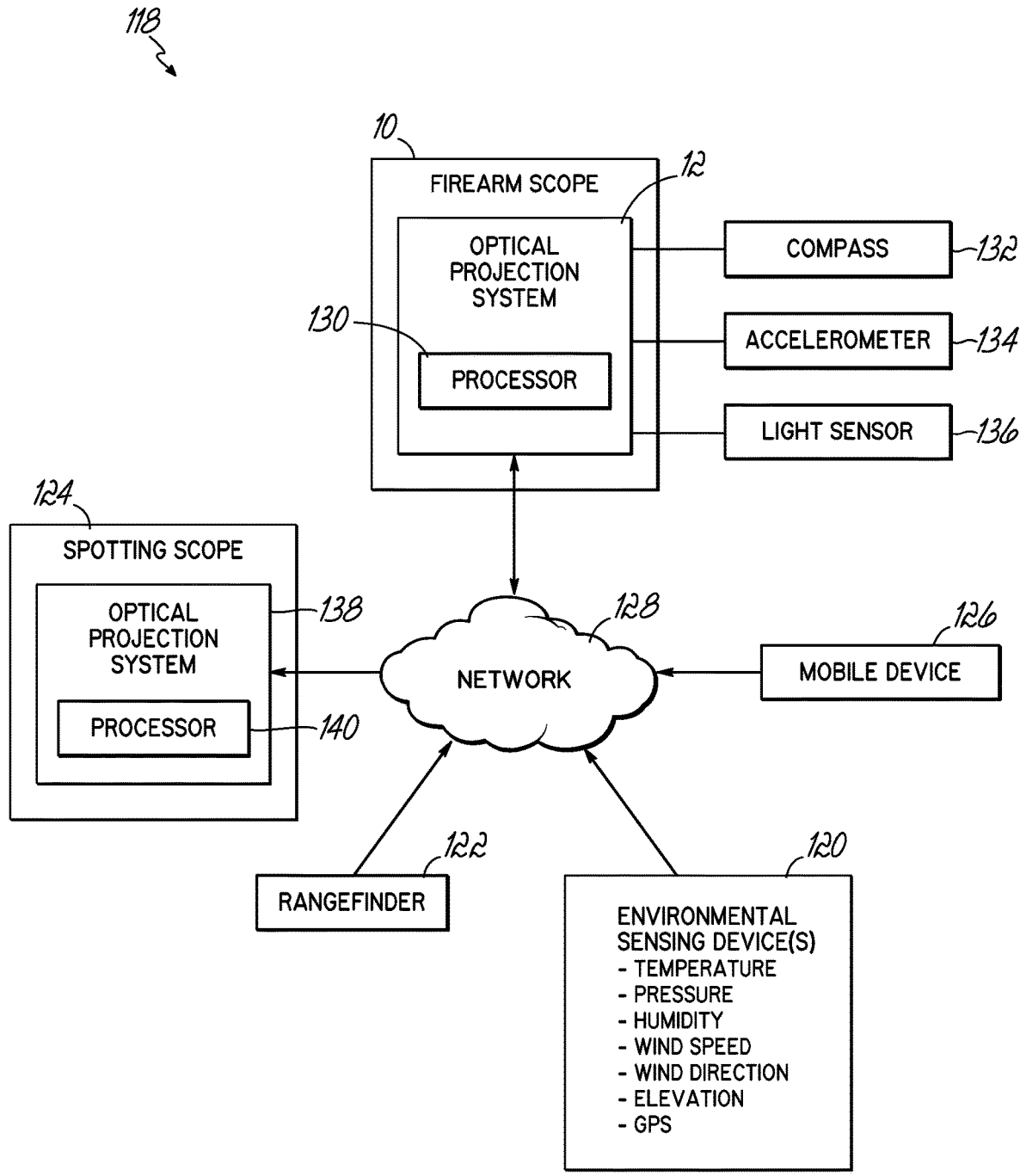
FIG. 9 is a diagrammatic view of an exemplary targeting information system that includes the firearm scope optical projection system.

Referring now to FIG. 9, a targeting information system 118 according to an exemplary embodiment of the invention is schematically shown. The targeting information system 118 includes the optical projection system 12 (either integral with or attached in alignment with the firearm scope), one or more environmental sensing devices 120, a rangefinder 122, and optionally a spotting scope 124 and a mobile device 126 (such as a smartphone). As described below, these devices 12, 120, 122, 124, 126 may be selectively paired (or "synced") to communicate with one another wirelessly or by wired connection(s).

The optical projection system 12 communicates with the environmental sensing devices 120, the rangefinder 122, the spotting scope 124, and the mobile device 126 over a network 128. The network 128 may include one or more networks, which may be in the form of a wide area network (WAN) or a local area network (LAN), for example. The network 128 may provide wireless or wired communication between the optical projection system 12 and the other devices 120, 122, 124, 126. In exemplary embodiments, the network 128 may employ various forms of short-range wireless technologies, such as Bluetooth® or near-field communication (NFC), for example. In other embodiments, the network 128 may utilize one or more network technologies such as Ethernet, Fast Ethernet, Gigabit Ethernet, virtual private network (VPN), remote VPN access, or a variant of IEEE 802.11 standard such as Wi-Fi and the like, for example. In an exemplary embodiment, the optical projection system 12 may communicate with the environmental sensing devices 120 and/or the rangefinder 122 directly using USB and/or RS-232, for example. The network 128 may act as a data and/or power bus. Communication over the network 128 may take place using one or more network communication protocols, including reliable streaming protocols such as transmission control protocol (TCP). It will be understood that these examples are merely illustrative and not exhaustive.

As shown in FIG. 9, the optical projection system 12 may include a processor 130, which may be incorporated within the circuit board assembly 40, for example. The processor 130 may include one or more devices selected from microprocessors, micro-controllers, digital signal processors, microcomputers, central processing units, field programmable gate arrays, programmable logic devices, state machines, logic circuits, analog circuits, digital circuits, or any other devices configured to manipulate signals (analog or digital). The processor 130 may be arranged internally within the scope 10 and integrated within the structure of the optical projection system 12, for example in the circuit board assembly 40. Alternatively, the processor 130 may be mounted externally from the scope 10 and coupled to the optical projection system 12 via one or more data transmission connections. For example, in one embodiment the processor 130 may be arranged in an external device (such as a smartphone). The processor 130 may receive and process information from the environmental sensing devices 120, the rangefinder 122, the mobile device 126, and/or additional sensing devices 132, 134, 136, described below, and may calculate a ballistic solution to be displayed to the shooter via the projected data image described above (see, e.g., data image 88 in FIGS. 7 and 8).

The optical projection system 12 may also communicate with additional sensors including a compass 132, an accelerometer 134, and a light sensor 136 that detect and inform the optical projection system 12 (and/or processor 130) of certain respective conditions. For example, the compass 132 may detect and inform the optical projection system 12 of a direction in which the scope 10 is pointed (e.g., North, South, East, West, and compass azimuth intervals thereof). The accelerometer 134, which may be a 3-axis accelerometer, for example, may detect and inform the optical projection system 12 of an orientation in which the scope 10 is supported (e.g., cant angle and/or inclination angle). The light sensor 136 may detect and inform the optical projection system 12 of an ambient lighting condition to adjust the intensity of the displayed image and/or other variables. As schematically represented in FIG. 9, these additional sensors 132, 134, 136 may be coupled to the optical projection system 12 via one or more wired or wireless connections, for example. In exemplary embodiments, the sensors 132, 134, 136 may be integrated within the circuit board assembly 40. Or, some or all of these sensors 132, 134, 136 may be located in another component of the system, such as the mobile device 126 (smartphone).

Generally, devices like an electronic compass 132, a three-axis accelerometer 134 for sensing orientation, and a light sensor 136 are items that presently have been miniaturized, fully provide the required level of accuracy and precision, and are commercially available at very low cost. Thus, it is beneficial and cost effective to integrate such features into an optical projection system 12 that is in or on the housing of the scope 10. In contrast, devices like laser rangefinders 122 and some environmental sensing devices 120 can vary greatly in cost, depending on size and quality, and are still the subject of developing technological advancements. Thus, having a laser rangefinder 122, for example, that is separate from the scope 10 and/or optical projection system 12 allows the user to choose a device of the appropriate level of quality and cost for their specific needs or budget. Likewise, wind sensing and other environmental measurement devices are available in a variety of types, quality, and price points. The technology of wind sensing, for example, is rapidly developing from rotary vane anemometers, available now in a compact size and at relatively low cost, to thermal and athermalized infrared laser wind sensing devices that are currently significantly larger, not widely available commercially, and significantly higher in cost. Thus, having certain environmental sensing devices that are separate from the scope 10 and/or optical projection system 12 allows the user to choose a device of the appropriate level of quality and cost for their specific needs or budget, and to upgrade the device to one that includes later-developed technologies without having to replace the optical components 10, 12 of the ballistic solution calculating and aiming system.

The rangefinder 122 may detect and communicate to the optical projection system 12 (and processor 130) a distance (or "range") measured from the scope 10 to the target object 96, and may be of various suitable types known in the art. The environmental sensing devices 120 may detect and communicate to the optical projection system 12 various environmental conditions including temperature, pressure, humidity, wind speed, wind direction, elevation, and global positioning system (GPS) location, for example, corresponding to a region in the immediate vicinity of the scope 10. Alternatively, GPS location technology is commonly included in many mobile devices 126 (smartphones). In one embodiment, the environmental sensing devices 120 may include a handheld weather meter of various suitable and commercially available types known in the art, such as a Kestrel® (made by Nielsen-Kellerman Co. of Minneapolis, Minn.) or WeatherFlow™ (made by WeatherFlow, Inc. of Scotts Valley, Calif.) brand weather meter or sensing component attachable to a smartphone or other hand-held personal digital device, for example. The environmental sensing devices 120 may also include a GPS tracking device that detects and communicates to the optical projection system GPS coordinates corresponding to an area in which the firearm scope 10, and firearm, is located. In another embodiment, the GPS tracking device may be integrated within the structure of the optical projection system 12, it may be mounted to the scope 10 or firearm and coupled directly to the optical projection system 12, or it may be integrated into the mobile device 126 (smartphone).

As described above, the environmental sensing devices 120 and the rangefinder 122 may communicate wirelessly with the firearm optical projection system 12. Accordingly, and advantageously, these devices 120, 122 may be arranged separately from the scope 10 and may be selectively paired with the optical projection system 12 as desired. For example, in some embodiments one or more of the devices 120, 122 may be mounted directly to the firearm, separately from the scope 10. In other embodiments, one or more of the devices 120, 122 may be arranged separately from the firearm but within close enough proximately to the scope 10 to enable wired or wireless communication, for example via Bluetooth®, between the devices 120, 122 and the optical projection system 12 for data communication therebetween.

The environmental measurements collected by the rangefinder 122 and the one or more environmental sensing devices 120 are communicated to the optical projection system 12 via signals sent over the network 128. In response to receiving the signals and, optionally, an instruction provided by the shooter/spotter, the optical projection system 12 may calculate, with its processor 130, an appropriate ballistic solution based on the environmental measurement values and using known mathematical formulae. The ballistic solution may then be presented to the shooter/spotter via the data image 88, as generally described above. The shooter may then make appropriate aiming corrections while maintaining sight of the target object 96 through the scope 10. The GPS coordinates provided by the GPS tracking device may be displayed with the ballistic solution in the data image 88 (not shown).

Alternatively, a second or alternate ballistic solution calculation processor (not shown) can be located separate from the scope 10 and optical projection system 12, such as part of an environmental sensing device 120 or as a software application on a mobile device 126. For example, if the user prefers a ballistic solution calculator that uses a different algorithm and/or one that uses different stored and/or sensed data, it can connect with the optical projection system 12 via the network 128 to use it as a passive or "dumb" display device to overlay an alternate data image 88 with the optical target image 90. Although there are technological benefits to having the processor 130 integral with the optical projection system 12, such as so that a graphic data image does not have to be communicated through a data bus or network 128, this feature can allow the user flexibility and future adaptability without having to modify or replace the projection system 12 and/or optical scope 10.

A "mobile device" 126 may be in the form of a cell phone (smartphone), tablet computer, or laptop personal computer, for example, and may communicate with one or more devices of the targeting information system 118, over the network 128, to send and/or receive targeting information as desired. In one embodiment, the mobile device 126 may communicate with the optical projection system 12, or with the rangefinder 122 and environmental sensing devices 120, to receive signals providing the measurements collected by the rangefinder 122 and sensing devices 120. In another embodiment, the mobile device 126 may communicate with the optical projection system 12 to receive signals providing the ballistic solution displayed via the data image 88. In either embodiment, the mobile device 126 may then display the information that it receives, via the signals, on its own display. A similar network connection can be made to a desktop computer (not shown) when not in the field to upload or download ballistic data or to make other software or firmware changes.

In other exemplary embodiments, the mobile device 126 may be utilized to send information to the optical projection system 12. For example, in one embodiment, the mobile device 126 may run a software application that can be used by the shooter, or another user, to input information or instructions that the mobile device 126 communicates to the optical projection system 12 via the network 128. Such information may include ballistic information or instructions specifying when a ballistic solution is to be calculated and how the ballistic solution is to be displayed via the data image 88. In another embodiment, the mobile device 126 may serve as a GPS tracking device, and may communicate GPS coordinates to the optical projection system 12 to be displayed within the data image. In yet another embodiment, the mobile device 126 may receive measurements collected by the rangefinder 122, environmental sensing devices 120, compass 132, and accelerometer 134, and may then calculate the ballistic solution, for example using the software application. The mobile device 126 may then communicate the ballistic solution to the optical projection system 12 for presentation to the shooter/spotter via the data image 88.

A spotting scope 124 may be positioned remotely from the firearm scope 10 having the optical projection system 12, but within close enough proximately to the firearm scope 10 to enable wired or wireless communication, for example via Bluetooth®, between the spotting scope 124 and the firearm scope 10 optical projection system 12. Likewise, the spotting scope 124 may include a second optical projection system 138, having a processor 140, similar in construction and function to the optical projection system 12 integrated within the firearm scope 10. The spotting scope optical projection system 138 may communicate over the network 128 with one or more of the devices of the targeting information system 118, such as the firearm scope optical projection system 12, rangefinder 122, or environmental sensing devices 120, so as to generate and display the same data image 88 displayed by the firearm scope 10 optical projection system 12. In this manner, a spotter looking through an eyepiece of the spotting scope 124 may advantageously view the same targeting information, including a ballistic solution, for example, viewed by the shooter looking through the eyepiece 20 of the firearm scope 10.

The optical projection system 12 of the firearm scope 10 may be powered by any suitable power source. In one embodiment, the projection system 12 may include an integrated power source, such as a battery (not shown). In other embodiments, the projection system 12 may be directly coupled to and powered by an external power source through a detachable connector 45. For example, the external power source may be housed within or otherwise mounted to any suitable portion of the firearm, such as a mounting device for the scope 10 or the firearm stock/chassis. In another embodiment, the external power source may be a power source of the rangefinder 122 or any of the environmental sensing devices 120. The optical projection system 12 may include a power regulator and a converter (not shown) for modifying power input as needed.

In another exemplary embodiment, the targeting information system 118 may include two or more optical projection systems 12, each corresponding to a respective firearm scope 10. Each optical projection system 12 may receive the same environmental measurements from a common or separate rangefinder 122 and/or common environmental sensing devices 120, and may reference its own respective compass 132 and accelerometer 134, for example, to calculate its own respective ballistic solution to be displayed to its respective shooter. In an exemplary embodiment, each optical projection system 12 may communicate with its own respective GPS tracking device for detecting a GPS location of the firearm scope 10 and the respective shooter. The GPS location detected by each GPS tracking device may be communicated over the network 120 to each of the other optical projection systems 12, 138. Accordingly, each of the optical projection systems 12, 138 may display, via its respective data image, the GPS location of each of the multiple shooters to a common spotter or observer. Inclusion of a camera (not shown) in the firearm scope 10 and/or spotting scope 124 may allow one shooter or spotter to communicate to another an image of the target area, temporarily overlaid on the optical image, so as to show the other some visual aspect of the target area without either of them having to disrupt their viewing positions.

While the present invention has been illustrated by the description of specific embodiments thereof, and while the embodiments have been described in considerable detail, it is not intended to restrict or in any way limit the scope of the appended claims to such detail. The various features discussed herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope of the general inventive concept.

What is claimed is:

1. An optical projection system for a weapon system aiming scope having at least objective and ocular lenses defining an optical path through which a target image is observed, comprising:
   a primary beamsplitter positioned in the optical path between the objective and ocular lenses;
   a secondary beamsplitter positioned against the primary beamsplitter and off the optical path;
   a micro-display that provides a data image containing targeting information; and
   an illumination source, wherein the illumination source generates light directed through the secondary beamsplitter to illuminate and reflect off the micro-display so as to define a reflected data image, wherein the secondary beamsplitter directs the reflected data image into the primary beamsplitter, and wherein the primary beamsplitter combines the data image with an optical target image in the optical path so as to convey targeting information to a shooter viewing the optical target image.

2. The system of claim 1, wherein the targeting information presented by the data image includes a ballistic aiming solution.

3. The system of claim 1, wherein the micro-display is an LCOS display.

4. The system of claim 1, further comprising a scope body, wherein the optical projection system is housed within the scope body.

5. The system of claim 4, further comprising an electrical component circuit board oriented substantially transverse to the optical path and defining an opening in the board through which the optical path extends.

6. The system of claim 1, wherein the primary beamsplitter includes at least one inner hypotenuse face having a coating comprising dielectric and silver layers configured to provide 70-80% transmission and 20-30% reflection of the data image received from the micro-display.

7. The system of claim 1, wherein the weapon system aiming scope including the optical projection system is mounted on a firearm.

8. A targeting information system of networked components for a weapon that fires a projectile from a barrel, the system comprising:
- a first optical sighting scope mountable on a weapon and having at least objective and ocular lenses defining an optical path through which a target image is observed;
- a first optical projection system, comprising:
  - a primary beamsplitter positioned in the optical path between objective and ocular lenses;
  - a secondary beamsplitter positioned against the primary beamsplitter and off the optical path;
  - a micro-display that presents a data image containing targeting information; and
  - an illumination source;
- a processor programmed to calculate a ballistic aiming solution;
- at least one environmental sensor to provide environmental data selected from the group of temperature, atmospheric pressure, humidity, wind speed, wind direction, elevation, and location;
- a rangefinder;
- an orientation sensor to provide at least one orientation datum selected from aiming angle, cant of the optical sighting scope relative to a weapon barrel, and azimuth;
- the environmental sensor, rangefinder, and orientation sensor communicating data to the processor, the processor using the data to calculate a ballistic aiming solution and communicating the solution to the micro-display, the illumination source generating light directed through the secondary beamsplitter to illuminate and reflect off the micro-display so as to define a reflected data image, and the secondary beamsplitter directing the reflected data image into the primary beamsplitter;
- wherein the primary beamsplitter combines the data image with an optical target image in the optical path so as to convey the aiming solution to a shooter viewing the optical target image through the ocular lens.

9. The system of claim 8, wherein the optical sighting scope includes a physical reticle.

10. The system of claim 9, wherein the data image includes an aiming point projected relative to the physical reticle.

11. The system of claim 8, further comprising:
- a second optical scope for an observer, the second scope not mounted on a weapon and having at least objective and ocular lenses defining an optical path through which a target image is observed;
- a second optical projection system, comprising:
  - a primary beamsplitter positioned in the optical path between the objective and ocular lenses;
  - a secondary beamsplitter positioned against the primary beamsplitter and off the optical path;
  - a micro-display that presents a data image containing targeting information; and
  - an illumination source;
- a communication means for receiving data from at least one of:
  - a processor programmed to calculate a ballistic aiming solution;
  - at least one environmental sensor to provide environmental data selected from the group of temperature, atmospheric pressure, humidity, wind speed, wind direction, elevation, and location;
  - a rangefinder;
  - an orientation sensor to provide at least one orientation datum selected from aiming angle, cant of the optical sighting scope relative to a weapon barrel, and azimuth; and
  - the first optical sighting scope,
- wherein the received data is communicated to the micro-display, the illumination source generates light directed through the secondary beamsplitter to illuminate and reflect off the micro-display so as to define a reflected data image, and the secondary beamsplitter directs the reflected data image into the primary beamsplitter;
- wherein the primary beamsplitter combines the data image with an optical target image in the optical path so as to convey the aiming solution to an observer viewing the optical target image through the ocular lens.

* * * * *